United States Patent
Kashiwagi et al.

(10) Patent No.: US 10,951,835 B1
(45) Date of Patent: *Mar. 16, 2021

(54) IMAGING DEVICE, METHOD, AND STORAGE MEDIUM

(71) Applicant: KABUSHIKI KAISHA TOSHIBA, Tokyo (JP)

(72) Inventors: Masako Kashiwagi, Ageo Saitama (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,554

(22) Filed: Mar. 4, 2020

(30) Foreign Application Priority Data

Sep. 12, 2019 (JP) .............................. JP2019-166564

(51) Int. Cl.
 *H04N 5/262* (2006.01)
 *H04N 5/232* (2006.01)

(52) U.S. Cl.
 CPC ..... *H04N 5/2621* (2013.01); *H04N 5/232127* (2018.08)

(58) Field of Classification Search
 CPC ............ H04N 5/2621; H04N 5/232127; G06T 7/571; G06T 2207/20084; G06T 2207/20081; G06T 2207/10024; G06T 2207/20021
 USPC ....................................................... 348/239
 See application file for complete search history.

(56) References Cited

U.S. PATENT DOCUMENTS

| | | | | |
|---|---|---|---|---|
| 8,698,943 | B2* | 4/2014 | Isogai | G01C 3/32 348/349 |
| 10,571,246 | B2* | 2/2020 | Yamaguchi | G06T 5/003 |
| 10,841,493 | B2* | 11/2020 | Tsuruyama | G03B 35/12 |
| 2012/0044400 | A1* | 2/2012 | Okada | H04N 5/23293 348/333.01 |
| 2012/0300114 | A1* | 11/2012 | Isogai | H04N 5/23212 348/345 |
| 2013/0307966 | A1* | 11/2013 | Komatsu | G06T 7/571 348/135 |
| 2018/0136477 | A1* | 5/2018 | Moriuchi | H04N 9/0455 |
| 2018/0137629 | A1* | 5/2018 | Mishma | G06T 7/174 |
| 2018/0139378 | A1* | 5/2018 | Moriuchi | G06T 7/571 |

(Continued)

FOREIGN PATENT DOCUMENTS

| | | |
|---|---|---|
| JP | 5832424 B2 | 12/2015 |
| JP | 2020-26990 A | 2/2020 |
| JP | 2020-148483 A | 9/2020 |

*Primary Examiner* — Pritham D Prabhakher
(74) *Attorney, Agent, or Firm* — Finnegan, Henderson, Farabow, Garrett & Dunner, L.L.P.

(57) ABSTRACT

According to one embodiment, an imaging device includes a first optical system including a lens and is configured to control a position of the lens to adjust a focal point. The imaging device includes first storage and a processor. The first storage is configured to store a statistical model generated by learning bokeh which occurs in an image influenced by aberration of a second optical system and changes nonlinearly in accordance with a distance to a subject in the image. The processor is configured to acquire an image influenced by aberration of the first optical system, input the acquired image to the statistical model and acquire distance information, and control the position of the lens included in the first optical system.

12 Claims, 23 Drawing Sheets

(56) References Cited

U.S. PATENT DOCUMENTS

| | | | |
|---|---|---|---|
| 2019/0014262 A1* | 1/2019 | Yamaguchi | G06T 7/55 |
| 2020/0051264 A1 | 2/2020 | Mishima et al. | |
| 2020/0065942 A1* | 2/2020 | Hiasa | H04N 5/2621 |
| 2020/0090306 A1* | 3/2020 | Cho | G06T 5/30 |
| 2020/0092464 A1* | 3/2020 | Kozakaya | G06K 9/20 |
| 2020/0294260 A1 | 9/2020 | Kashiwagi et al. | |

* cited by examiner

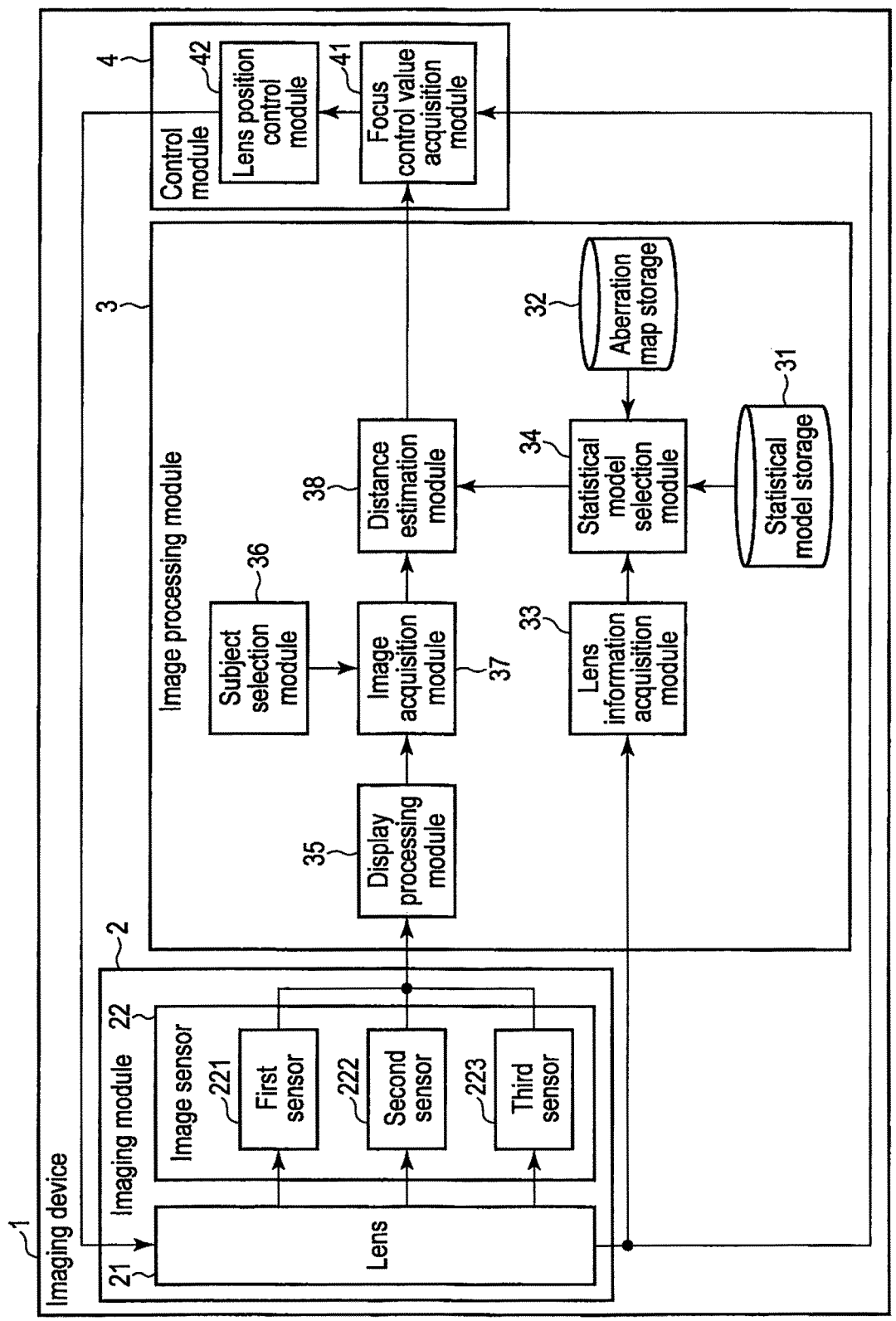
F I G. 1

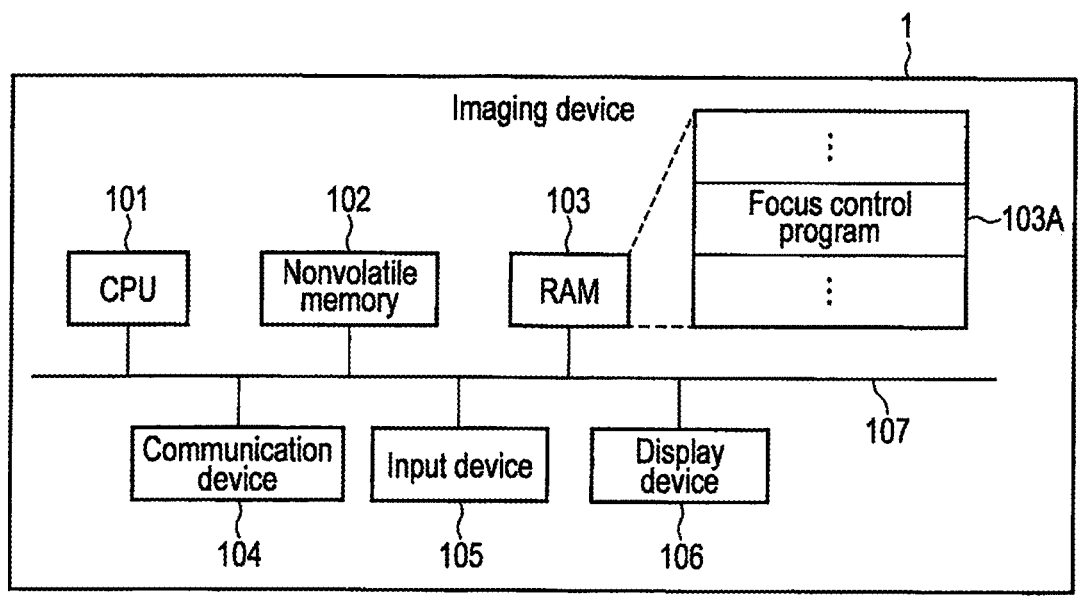
F I G. 2
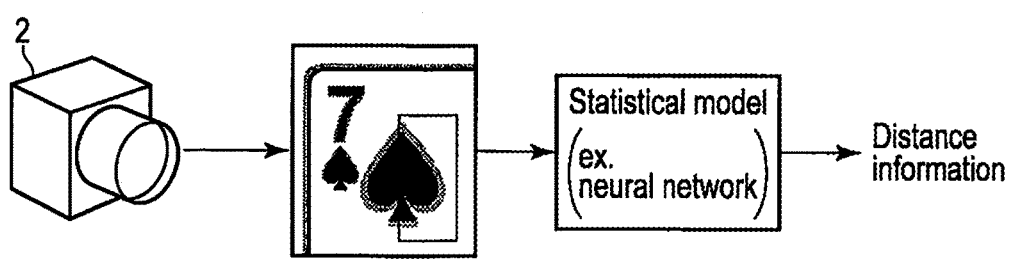
F I G. 3

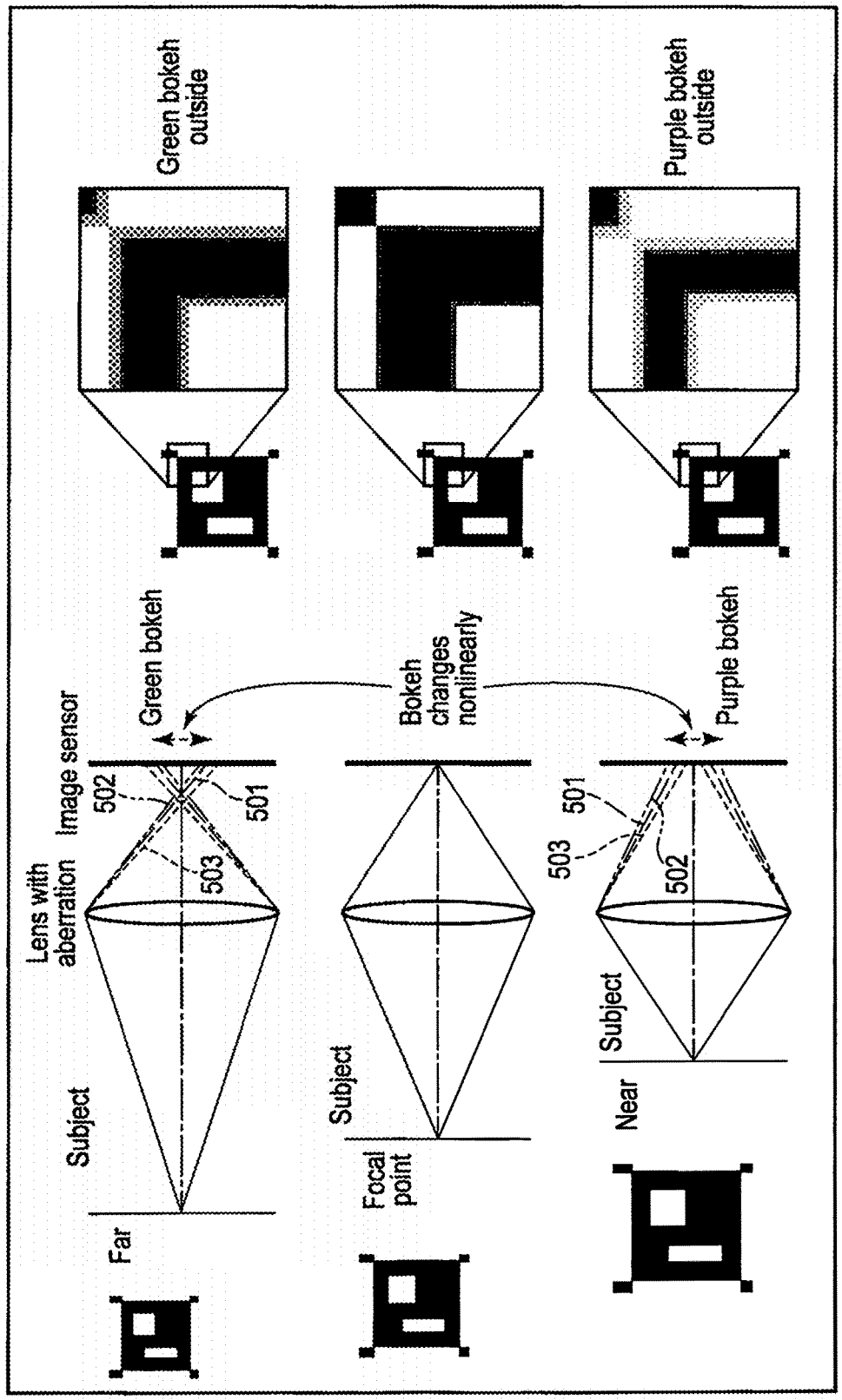
F I G. 5

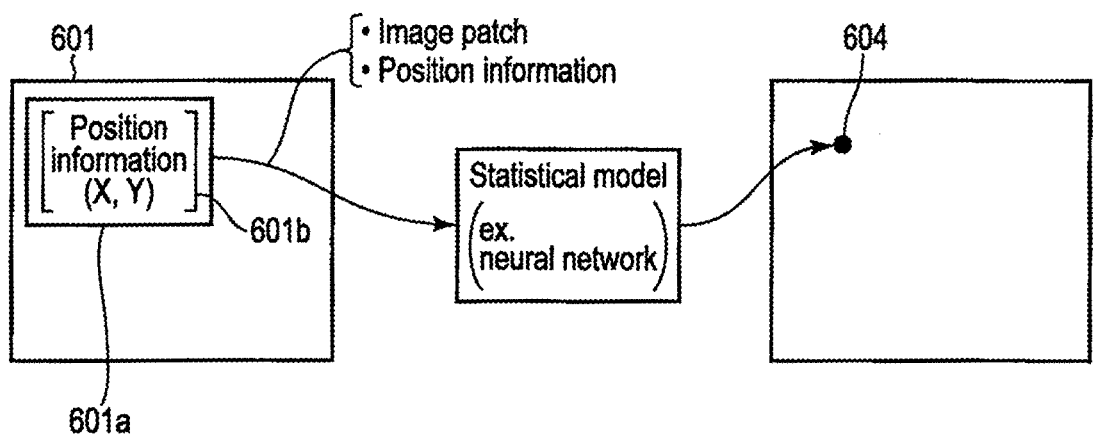
F I G. 15

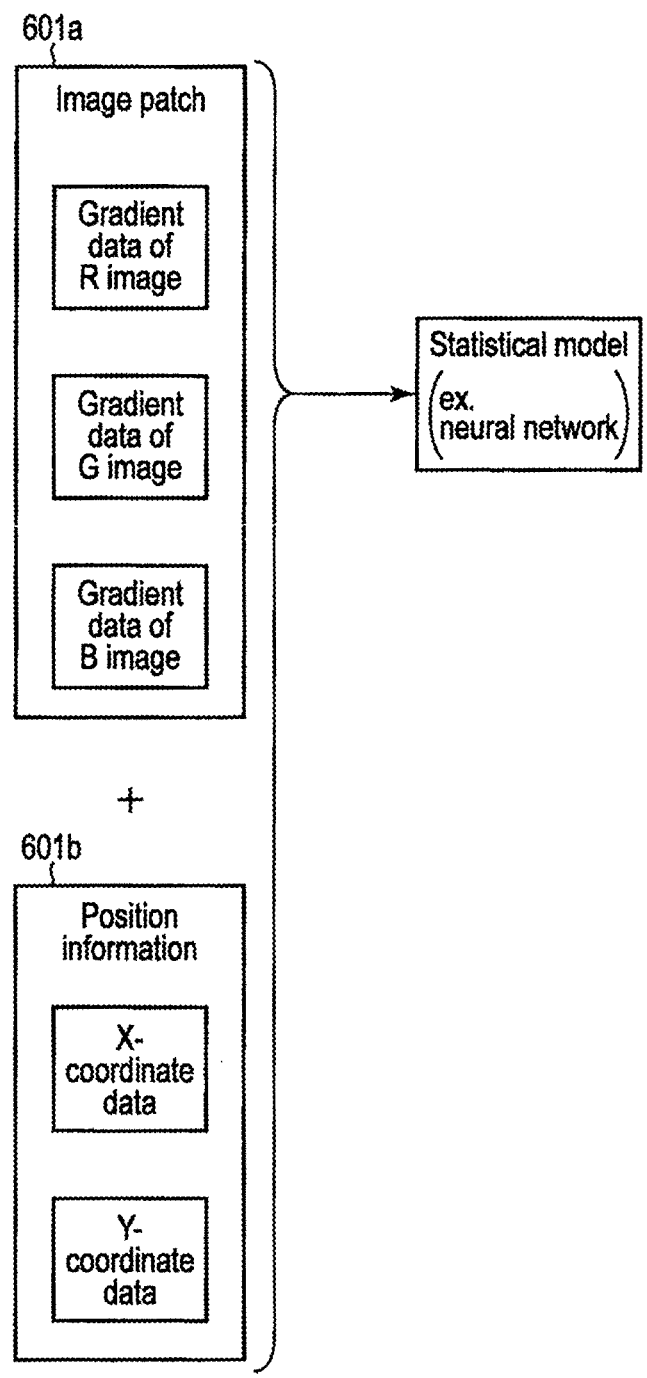
F I G. 16

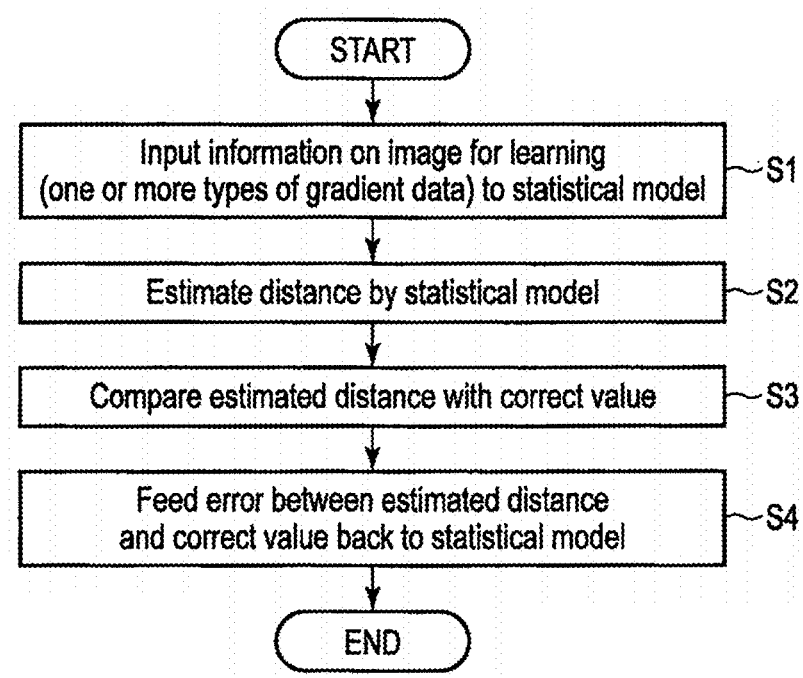
F I G. 20

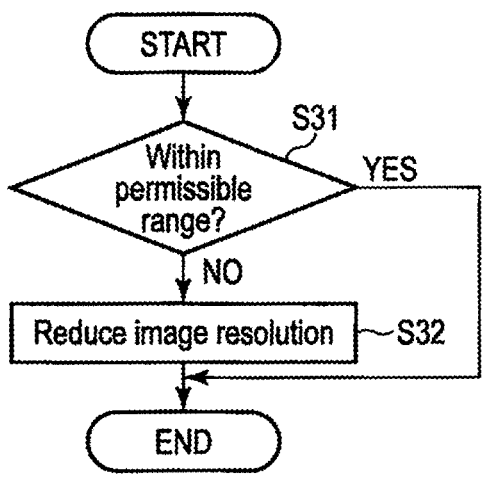
F I G. 24
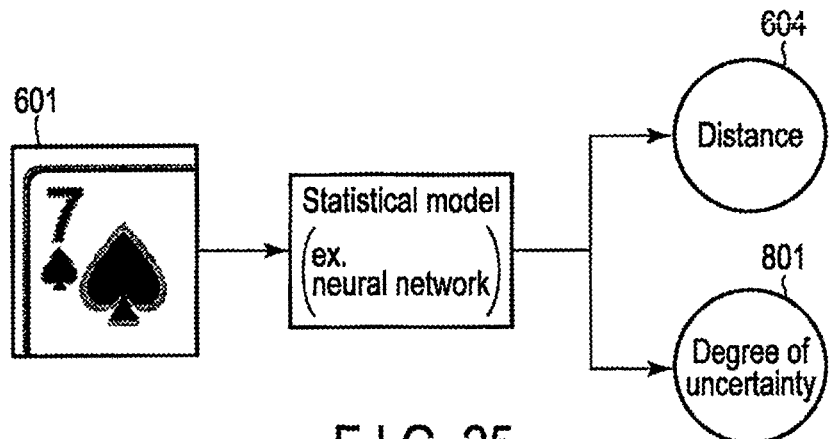
F I G. 25
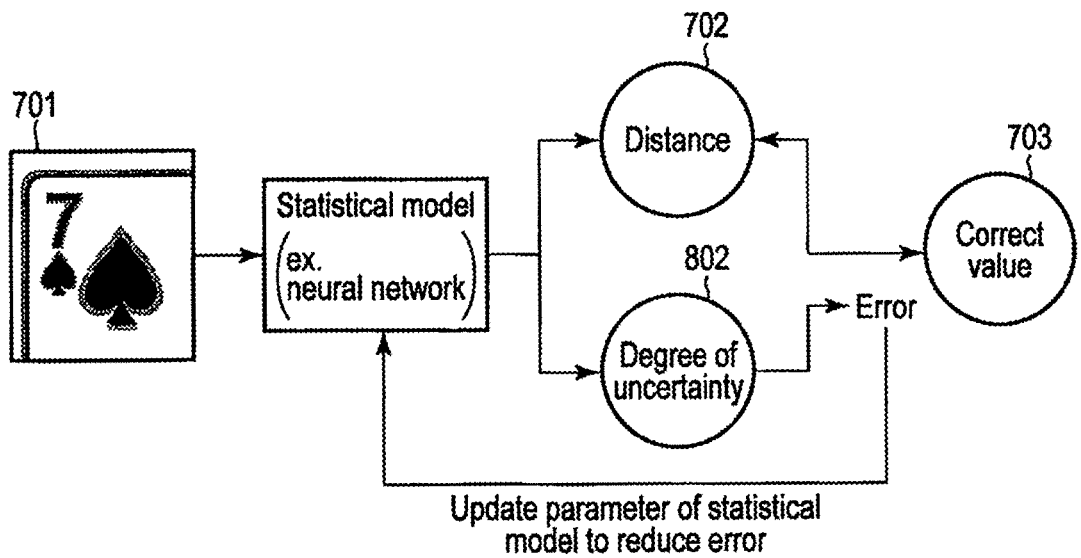
F I G. 26

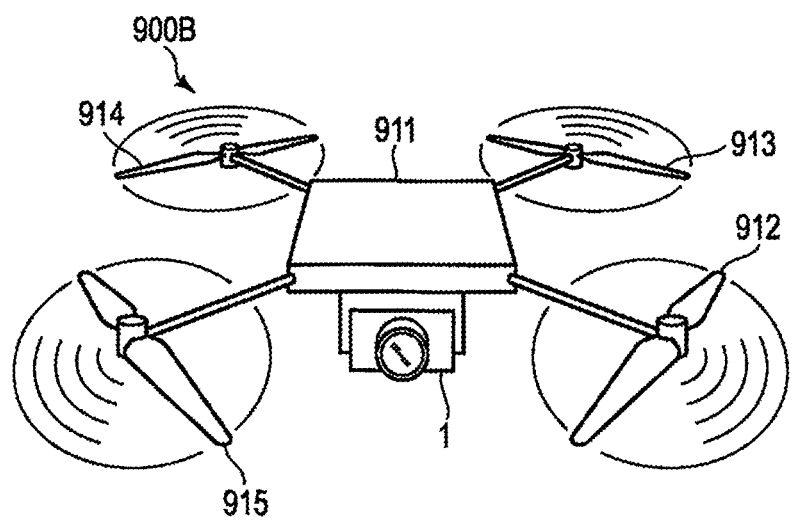
F I G. 30
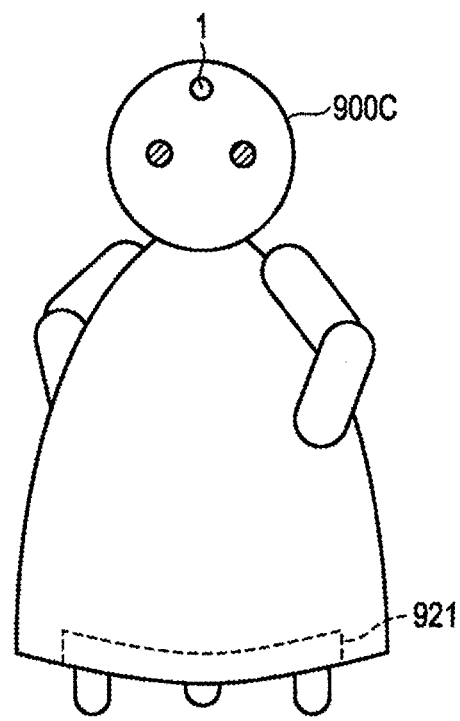
F I G. 31

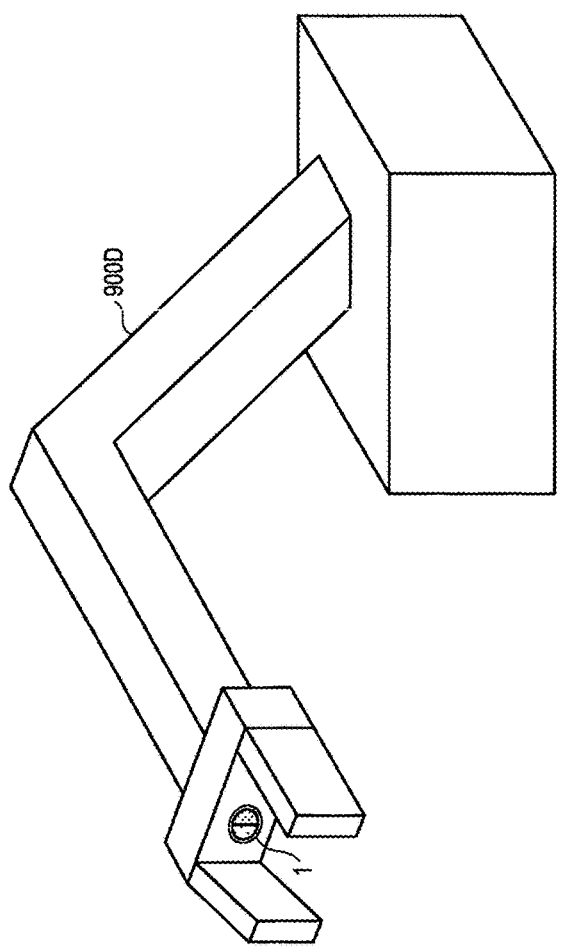
F I G. 32

IMAGING DEVICE, METHOD, AND STORAGE MEDIUM

CROSS-REFERENCE TO RELATED APPLICATIONS

This application is based upon and claims the benefit of priority from Japanese Patent Application No. 2019-166564, filed Sep. 12, 2019, the entire contents of which are incorporated herein by reference.

FIELD

Embodiments described herein relate generally to an imaging device, a method, and a storage medium.

BACKGROUND

In general, in an imaging device capable of capturing images, a specific subject can be made to come into focus by controlling a position of a lens included in an optical system of the imaging device (i.e., controlling focus).

However, when the time required to control a position of such a lens is long, a long time is spent until images are captured and convenience for the user using the imaging device is deteriorated.

BRIEF DESCRIPTION OF THE DRAWINGS

FIG. 1 is a diagram showing an example of a configuration of an imaging device according to an embodiment.

FIG. 2 is a diagram showing an example of a system configuration of the imaging device.

FIG. 3 is a diagram illustrating an outline of operations of the imaging device when acquiring distance information.

FIG. 5 is a diagram illustrating a relationship between a distance to a subject and bokeh which occurs in an image due to chromatic aberration in a case of using an achromatic lens.

FIG. 15 is a diagram illustrating a second method of estimating the distance from a captured image.

FIG. 16 is a diagram showing an example of information input to the statistical model in the second method.

FIG. 20 is a flowchart showing an example of a procedure of a process of generating the statistical model.

FIG. 24 is a flowchart showing an example of a procedure of a process executed as a measure when the distance information cannot be acquired from the captured image.

FIG. 25 is a diagram illustrating an outline of a modified example of the embodiment.

FIG. 26 is a diagram showing an example of a learning method of the statistical model.

FIG. 30 is a diagram illustrating a case where the mobile object is a drone.

FIG. 31 is a diagram illustrating a case where the mobile object is an autonomous mobile robot.

FIG. 32 is a diagram illustrating a case where the mobile object is a robot arm.

DETAILED DESCRIPTION

Figure 4:
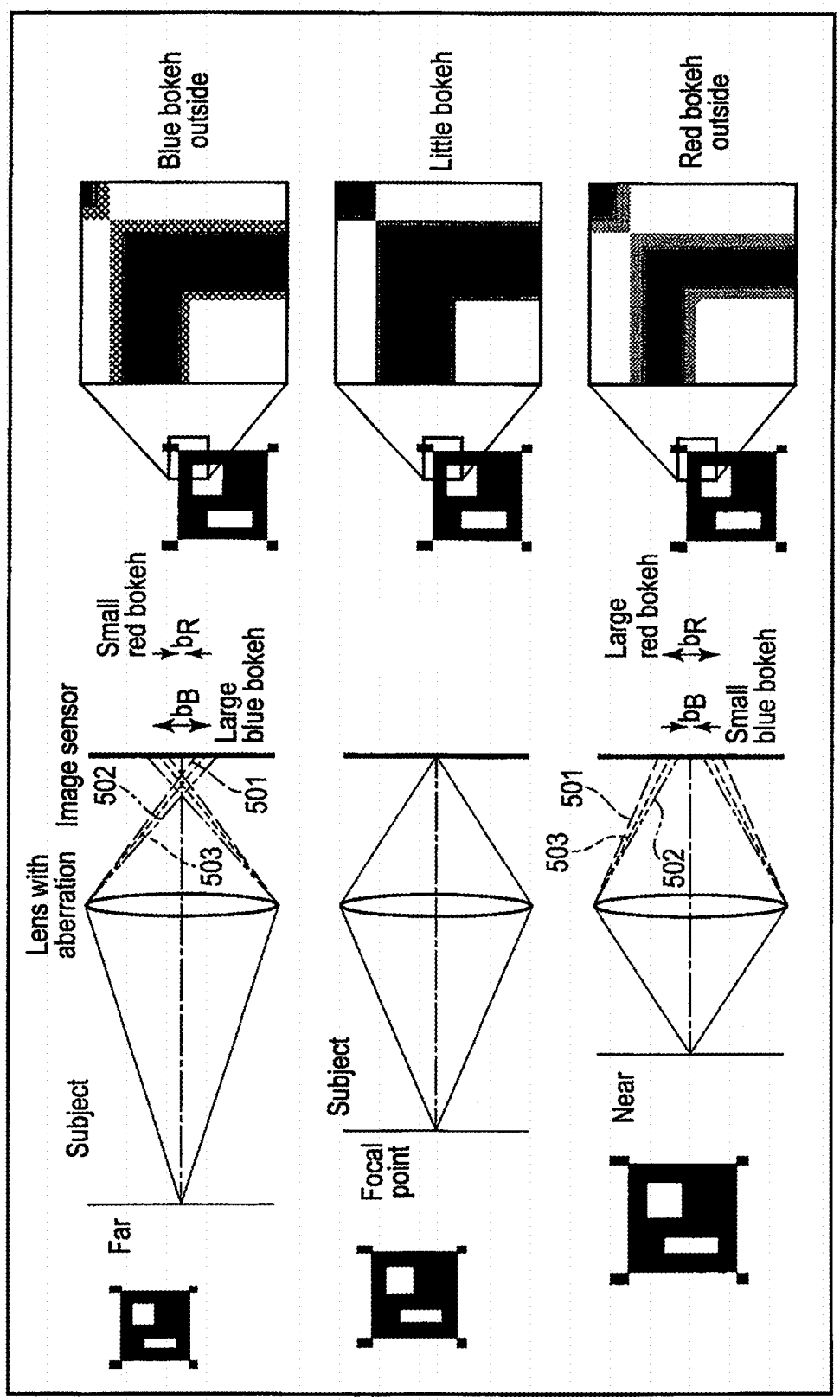
FIG. 4 is a diagram illustrating a relationship between a distance to a subject and bokeh which occurs in an image due to chromatic aberration in a case of using a single lens.

In general, according to one embodiment, an imaging device includes a first optical system including a lens and is configured to control a position of the lens to adjust a focal point. The imaging device includes first storage and a processor. The first storage is configured to store a statistical model generated by learning bokeh which occurs in an image influenced by aberration of a second optical system and changes nonlinearly in accordance with a distance to a subject in the image. The processor is configured to acquire an image influenced by aberration of the first optical system, input the acquired image to the statistical model and acquire distance information indicative of a distance to a subject in the image, and control the position of the lens included in the first optical system.

Various embodiments will be described hereinafter with reference to the accompanying drawings.

FIG. 1 shows an example of a configuration of an imaging device according to the embodiment. An imaging device 1 shown in FIG. 1 is implemented as, for example, a digital camera or the like and includes an imaging module 2, an image processing module 3, and a control module 4.

The imaging module 2 is used to capture various images. The imaging module 2 includes a lens 21 and an image sensor 22. The lens 21 and the image sensor 22 correspond to an optical system (monocular camera) of the imaging device 1. In addition, in the embodiment, the lens 21 constitutes a lens unit together with a focus adjustment mechanism (lens driving circuit) which controls a focal point by adjusting a position of the lens 21, a diaphragm mechanism (aperture control circuit) which includes an aperture part to adjust the quantity of light (quantity of incident light) taken in the optical system of the imaging device 1, a control circuit which incorporates a memory (not shown) preliminarily holding information on the lens 21 (hereinafter referred to as lens information), and the like.

In addition, in the embodiment, the imaging device 1 is configured such that the lens 21 (lens unit) can be manually exchanged with the other lens and, for example, the user can use one of plural types of lenses such as a standard lens, a telephoto lens, wide-angle lens, and the like, by attaching the lens to the imaging device 1. When the lens is exchanged, the focal length and the F-number (aperture number) are changed, and images corresponding to the lens used in the imaging device 1 can be captured.

In the embodiment, the focal length is a distance from a lens to a position where the light made incident on the lens in parallel is converged. In addition, the F-number is a numerical value of the quantity of the light taken in the imaging device 1 in accordance with the diaphragm mechanism. The F-number indicates that as the value becomes smaller the quantity of the light taken in the imaging device 1 is increased (i.e., the size of the aperture part becomes larger).

Light reflected at a subjected is made incident on the lens 21. The light made incident on the lens 21 is transmitted through the lens 21. The light transmitted through the lens 21 reaches the image sensor 22 and received (detected) by the image sensor 22. The image sensor 22 generates an image composed of a plurality of pixels by converting the received light into electric signals (photoelectric conversion).

The image sensor 23 is implemented by, for example, a charge coupled device (CCD) image sensor, a complementary metal oxide semiconductor (CMOS) image sensor and the like. The image sensor 22 includes, for example, a first sensor (R sensor) 221 that detects light of red (R) wavelength band, a second sensor (G sensor) 222 that detects light of green (G) wavelength band, and a third sensor (B sensor) 223 that detects light of blue (B) wavelength band. The image sensor 22 can receive the light of the corresponding wavelengths by the first to third sensors 221 to 223, and generate sensor images (R image, G image, and B image) corresponding to the respective wavelength bands (color components). That is, the image captured by the imaging module 2 is a color image (RGB image), and this image includes the R image, the G image, and the B image.

In the embodiment, the image sensor 22 including the first to third sensors 221 to 223 has been described, but the image sensor 22 may include at least one of the first to third sensors 221 to 223. In addition, the image sensor 22 may include, for example, a sensor to generate a monochrome image instead of the first to third sensors 221 to 223.

In the embodiment, the image generated based on the light transmitted through the lens 21 is an image influenced by the aberration of (lens 21 included in) the optical system. Details of the bokeh which occurs in the image will be described later.

The image processing module 3 includes as functional configuration statistical model storage 31, aberration map storage 32, a lens information acquisition module 33, a statistical model selection module 34, a display processing module 35, a subject selection module 36, an image acquisition module 37, and a distance acquisition module 38.

The statistical model storage 31 stores a statistical model used to acquire the distance to the subject from the image captured by the imaging module 2. The statistical model stored in the statistical model storage 31 is generated by learning the bokeh which occurs in the image influenced by the above-described aberration of the optical system and which changes nonlinearly according to the distance to the subject in the image. The statistical model storage 31 is assumed to store a plurality of statistical models though the details will be described later.

The statistical models can be generated by employing, for example, various known machine-learning algorithms such as a neural network and a random forest. In addition, a neural network applicable to the embodiment may include, for example, convolutional neural network (CNN), fully connected neural network, and the like.

The aberration map storage 32 stores map-formatted information (hereinafter referred to as aberration map) indicative of a distribution of the bokeh which occurs in the image influenced by the aberration of the optical system and which depends on the distance to the subject in the image and the position in the image. In other words, the aberration map is information indicative of distance dependency and position dependency of the bokeh (i.e., aberration of the optical system) in the image generated by the aberration. The aberration map storage 32 stores the aberration map for each of the above-described statistical models stored in the statistical model storage 31 (i.e., the aberration map is linked to the statistical model).

The lens information acquisition module 33 acquires lens information on the lens 21 included in the above-described optical system (imaging module 2) of the imaging device 1. The lens information is held in the memory provided in the lens unit as described above, and is acquired from the lens unit. The lens information includes the focal length, the F-number, the focal point, and the like of the lens 21.

The statistical model selection module 34 selects an appropriate statistical model from a plurality of statistical models stored in the statistical model storage 31, based on, for example, the lens information acquired by the lens information acquisition module 33. The statistical model selection module 34 may select the statistical model by using the aberration map stored in the aberration map storage 32.

The display processing module 35 sequentially displays a plurality of images sequentially captured by the imaging module 2 as preview display. The preview display indicates preliminarily displaying images for the user to confirm, for example, the subject which is a target to be focused as described later.

The subject selection module 36 selects a subject in the image displayed by the display processing module 35 (i.e., the image captured by the imaging module 2). The subject selected by the subject selection module 36 is determined based on, for example, user operations and the like.

When the subject in the image displayed by the display processing module 35 is selected by the subject selection module 36, the image acquisition module 37 acquires the image.

The distance acquisition module 38 acquires the distance information indicative of the distance to the subject selected by the subject selection module 36 in the image acquired by the image acquisition module 37. In this case, the distance acquisition module 38 acquires the distance information by inputting the image acquired by the image acquisition module 37 to the statistical model selected by the statistical model selection module 34 as described later.

The control module 4 is a functional module to control the focus in the imaging device 1 (imaging module 2) and includes a focus control value acquisition module 41 and a lens position control module 42. In the embodiment, "to control the focus" indicates to adjust the focal point (i.e., position focused at the imaging module 2) of the subject by changing the position of the lens 21 included in the imaging module 2.

The focus control value acquisition module 41 acquires the focus control value according to the distance information acquired by the distance acquisition module 38 (i.e., distance to the subject selected by the subject selection module 36). The focus control value is, for example, a value corresponding to the quantity of movement of the lens position and acquired based on the information held in the memory provided in the lens 21.

The lens position control module 42 controls the position of the lens 21 based on the focus control value acquired by the focus control value acquisition module 41. Thus, for example, the focus is adjusted on the subject selected by the subject selection module 36, and the imaging module 2 can capture the image in which the subject is focused.

FIG. 2 shows an example of a system configuration of the imaging device 1. As shown in FIG. 2, the imaging device 1 includes a bus 107 to interconnect a CPU 101, a nonvolatile memory 102, RAM 103, a communication device 104, an input device 105, and a display device 106. A hardware configuration on an optical system of the imaging device 1 is omitted in FIG. 2.

The CPU 101 is a hardware processor configured to control operations of various components in the imaging device 1. The CPU 101 may be a single processor or may be composed of a plurality of processors. The CPU 101 executes various programs that are loaded from the nonvolatile memory 102 into the RAM 103. These programs include an operating system (OS) and various application programs. The application programs include a focus control program 103A for controlling a focus based on distance information acquired from the image captured by the imaging device 1.

The nonvolatile memory 102 is a storage medium used as an auxiliary memory. The RAM 103 is a storage medium used as a main memory. The nonvolatile memory 102 and the RAM 103 alone are shown in FIG. 2, but the imaging device 1 may be configured to use, for example, the other storage device such as an SD card.

In the embodiment, the image processing module 3 and the control module 4 shown in FIG. 1 are partially or entirely implemented by causing the CPU 101 (i.e., a computer of the imaging device 1) to execute a focus control program 103A, i.e., software. The focus control program 103A may be stored in a computer-readable storage medium and distributed or may be downloaded to the imaging device 1 through a network. The image processing module 3 and the control module 4 may be partially or entirely implemented by hardware such as integrated circuits (IC) or may be partially or entirely implemented by a combination of software and hardware.

In addition, in the embodiment, the statistical model storage 31 and the aberration map storage 32 included in the image processing module 3 are implemented by, for example, the nonvolatile memory 102, the other storage device or the like.

The communication device 104 is a device configured to execute wired communication or wireless communication. The communication device 104 executes communications with an external device via a network.

The input device 105 includes, for example, various buttons provided on a housing of the imaging device 1 or the like. The display device 106 includes, for example, a liquid crystal display (LCD) provided on the housing of the imaging device 1 or the like. The imaging device 1 may include a touch screen display or the like capable of displaying, for example, various images and detecting contact positions of user's fingers on the images (i.e., touch operations).

Next, an outline of operations of the imaging device 1 when acquiring the distance information in the embodiment will be described with reference to FIG. 3.

In the imaging device 1, the imaging module 2 (image sensor 22) generates an image influenced by the aberration of the optical system (lens 21) as described above.

The image processing module 3 acquires the image generated by the imaging module 2 and inputs the image to the statistical model stored in the statistical model storage 31 (i.e., the statistical model selected by the statistical model selection module 34).

The image processing module 3 thereby acquires distance information indicative of the distance to the subject in the image output from the statistical model to which the image is input.

Thus, in the embodiment, the distance information can be acquired from the image captured by the imaging module 2 by using the statistical model.

In the embodiment, bokeh resulting from the aberration of the optical system (lens aberration) of the imaging device 1 occurs in the image captured by the imaging module 2 as described above.

The bokeh which occurs in the image captured by the imaging module 2 will be described below. First, bokeh regarding chromatic aberration of the bokeh resulting from the aberration of the optical system of the imaging module 2 will be described.

FIG. 4 illustrates a relationship between the distance to the subject and the bokeh which occurs in the image due to chromatic aberration.

Since the refractive indexes of the light transmitted through the lens 21 having aberration are different in respective wavelength bands, the light of the wavelength bands cannot be collected at one point and reaches different points when, for example, the subject position is displaced from the focal point. The displacement appears as chromatic aberration (bokeh) in the image.

The upper part of FIG. 4 indicates that the subject position for the imaging module 2 (image sensor 22) is farther than the focal point (i.e., the subject position is on the back side rather than the focal point).

In this case, for light 501 of a red wavelength band, an image including comparatively small bokeh bR is generated at the image sensor 22 (first sensor 221). In contrast, for light 502 of a blue wavelength band, an image including comparatively large bokeh bB is generated at the image sensor 22 (third sensor 223). For light 503 of a green wavelength band, an image including bokeh having a middle size of the bokeh bR and bokeh bB is generated. Therefore, in the image captured in a state in which the subject position is farther than the focal point, blue bokeh is observed outside the subject in the image.

In contrast, the lower part of FIG. 4 indicates that the subject position for the imaging module 2 (image sensor 22) is closer than the focal point (i.e., the subject position is located on the front side rather than the focal point).

In this case, for light 501 of a red wavelength band, an image including comparatively large bokeh bR is generated at the image sensor 22 (first sensor 221). In contrast, for light 502 of a blue wavelength band, an image including comparatively small bokeh bB is generated at the image sensor 22 (third sensor 223). For light 503 of a green wavelength band, an image including bokeh having a middle size of the bokeh bR and bokeh bB is generated. Therefore, in the image captured in a state in which the subject position is closer than the focal point, red bokeh is observed outside the subject in the image.

FIG. 4 shows the example of the single lens in which the lens 21 is simple but, in general, for example, a lens having chromatic aberration corrected (hereinafter referred to as an achromatic lens) is often used in the imaging module 2. The achromatic lens is a lens obtained by combining a convex lens of low dispersion and a concave lens of high dispersion, and lens in which the number of lenses is the smallest as a lens for correcting the chromatic aberration.

FIG. 5 illustrates a relationship between the distance to the subject and the bokeh which occurs in an image due to chromatic aberration in a case of using the above-described achromatic lens as the lens 21. The achromatic lens is designed to make focal points of the blue wavelength and red wavelength match, but the chromatic aberration cannot be completely removed. For this reason, green bokeh occurs as shown in the upper part of FIG. 5 when the subject position is farther than the focal point, and purple bokeh occurs as shown in the lower part of FIG. 5 when the subject position is closer than the focal point.

The middle part of each of FIG. 4 and FIG. 5 indicates that the subject position for the imaging module 2 (image sensor 22) and the focal point match. In this case, the image having little bokeh is generated at the image sensor 22 (first to third sensors 221 to 223).

The diaphragm mechanism is provided at the optical system (lens unit) of the imaging device 1 as described above, but the shape of the bokeh which occurs in the image captured by the imaging module 2 is changed in accordance with the size of the aperture part of the diaphragm mechanism. The shape of the bokeh is also referred to as point spread function (PSF) shape, which is indicative of spread distribution of the light occurring when a point source is captured.

Figure 6:
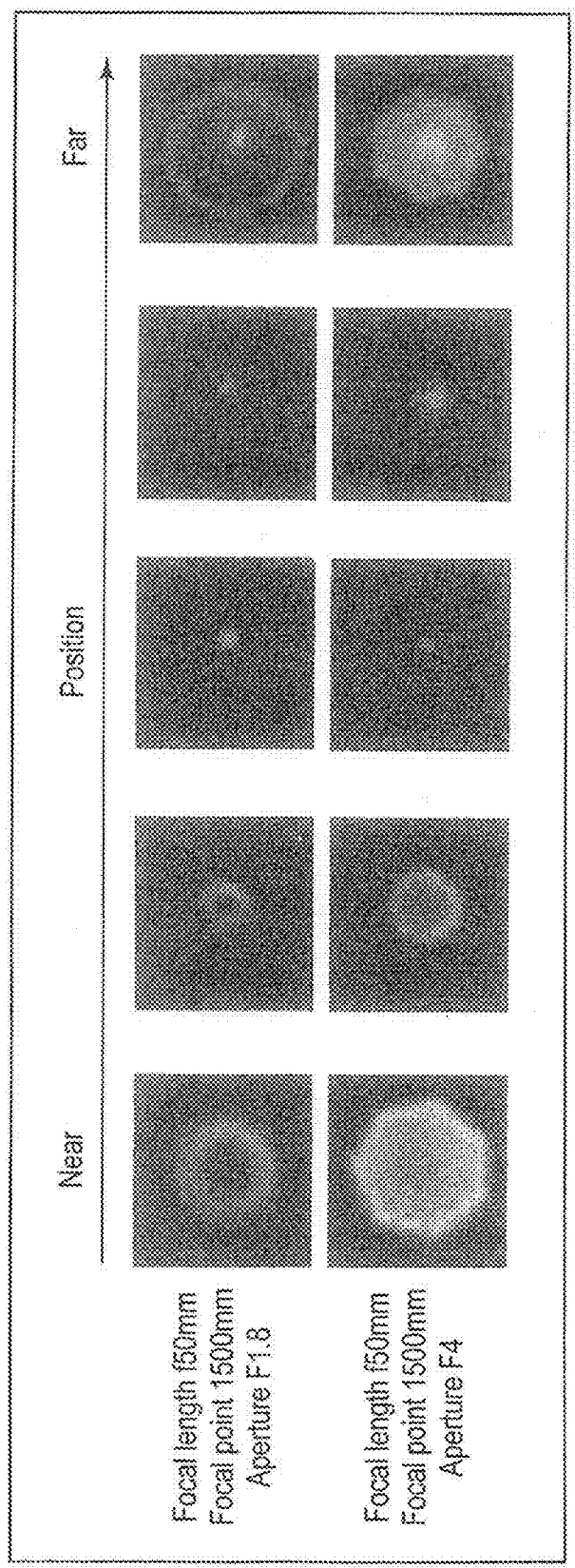
FIG. 6 is a diagram showing a relationship between a size of an aperture part of a diaphragm mechanism provided in an optical system of the imaging device and a PSF shape.

The upper stage of FIG. 6 shows the PSF shapes generated at the central parts of the images captured by the imaging module 2 when the focal point is set to 1500 mm and the F-number (aperture) is set to F1.8 in the optical system (imaging module 2) of the imaging device 1 using the lens having the focal length of 50 mm, from the left side in order of subject positions closer to the imaging device 1. The lower stage of FIG. 6 shows the PSF shapes generated in the images captured by the imaging module 2 when the focal point is set to 1500 mm and the F-number (aperture) is set to F4 in the optical system (imaging module 2) of the imaging device 1 using the lens having the focal length of 50 mm, from the left side in order of subject positions closer to the imaging device 1. Central parts of the upper and lower stages of FIG. 6 show the PSF shapes in a case where the subject position matches the focal point.

The PSF shapes shown at the corresponding positions on the upper and lower stages of FIG. 6 are the PSF shapes in a case where the subject positions for the imaging device 1 are the same but, even when the subject positions are the same, the PSF shapes on the upper stage (i.e., the PSF shapes generated in the images captured with the F-number set to F1.8) are different from the PSF shapes on the lower stage (i.e., the PSF shapes generated in the images captured with the F-number set to F4).

Furthermore, as shown in the PSF shapes on the leftmost side and the PSF shapes on the rightmost side in FIG. 6, the PSF shapes in a case where the subject position is closer than the focal point are different from those in a case where the subject position is farther than the focal point even when, for example, the distance from the subject position to the focal point is approximately the same.

Figure 7:
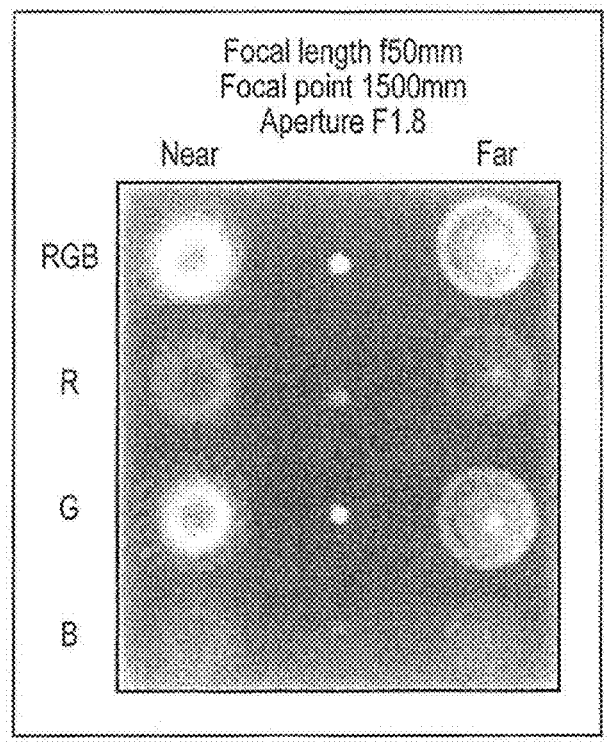
FIG. 7 is a diagram showing an example of a PSF shape generated in an image of each channel.
Figure 8:
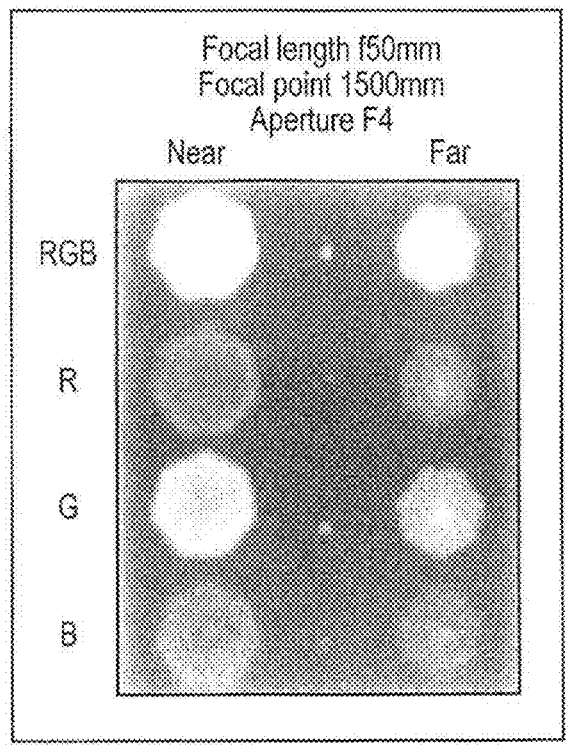
FIG. 8 is a diagram showing another example of the PSF shape generated in an image of each channel.

The phenomenon that the PSF shapes are varied in accordance with the size of the aperture part of the diaphragm mechanism and the subject position for the imaging device 1 as described above also occurs in each of channels (RGB, R image, G image, and B image). FIG. 7 shows the PSF shapes generated in the images of the respective channels captured by the imaging module 2 when the focal point is set to 1500 mm and the F-number is set to F1.8 in the imaging module 2 using the lens having the focal length of 50 mm, in a case where the subject position is closer than the focal point (i.e., located on the front side) and a case where the subject position is farther than the focal point (i.e., located on the back side). FIG. 8 shows the PSF shapes generated in the images of the respective channels captured by the imaging module 2 when the focal point is set to 1500 mm and the F-number is set to F4 in the imaging module 2 using the lens having the focal length of 50 mm, in a case where the subject position is closer than the focal point and a case where the subject position is farther than the focal point.

Furthermore, the PSF shapes generated in the images captured by the imaging module 2 are also varied in accordance with positions in the images.

Figure 9:
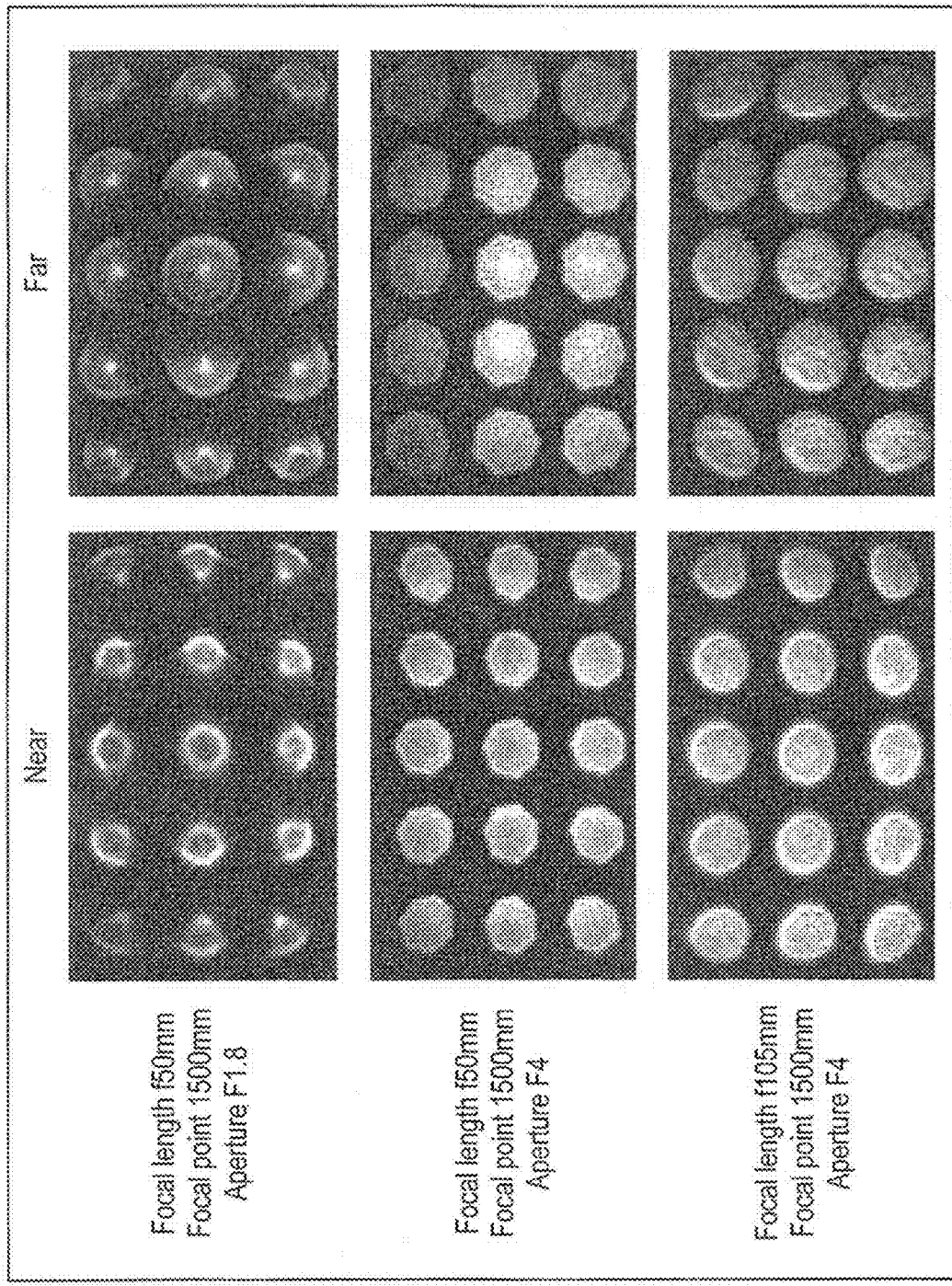
FIG. 9 is a diagram showing an example of a PSF shape generated at each position in an image.

The upper part of FIG. 9 shows the PSF shapes generated at the respective positions in the images captured by the imaging module 2 when the focal point is set to 1500 mm and the F-number is set to F1.8 in the imaging module 2 using the lens having the focal length of 50 mm, in a case where the subject position is closer than the focal point and a case where the subject position is farther than the focal point.

The middle part of FIG. 9 shows the PSF shapes generated at the respective positions in the images captured by the imaging module 2 when the focal point is set to 1500 mm and the F-number is set to F4 in the imaging module 2 using the lens having the focal length of 50 mm, in a case where the subject position is closer than the focal point and a case where the subject position is farther than the focal point.

As shown in the upper and middle parts of FIG. 9, for example, the PSF shapes different from the PSF shapes located near the center of the images can be observed in the vicinity of ends (in particular, the vicinity of the upper left corner and the like) of the images captured by the imaging module 2.

In addition, the lower part of FIG. 9 shows the PSF shapes generated at the respective positions in the images captured by the imaging module 2 when the focal point is set to 1500 mm and the F-number is set to F4 in the imaging module 2 using the lens having the focal length of 105 mm, in a case where the subject position is closer than the focal point and a case where the subject position is farther than the focal point.

The upper and middle parts of FIG. 9 shows the PSF shapes generated in the images captured with the same lens but, when the lens different in focal length is used, as shown on the lower stage of FIG. 9, the different PSF shapes according to the lens (i.e., the PSF shapes different from those on the upper and middle stages of FIG. 9) are observed.

Figure 10:
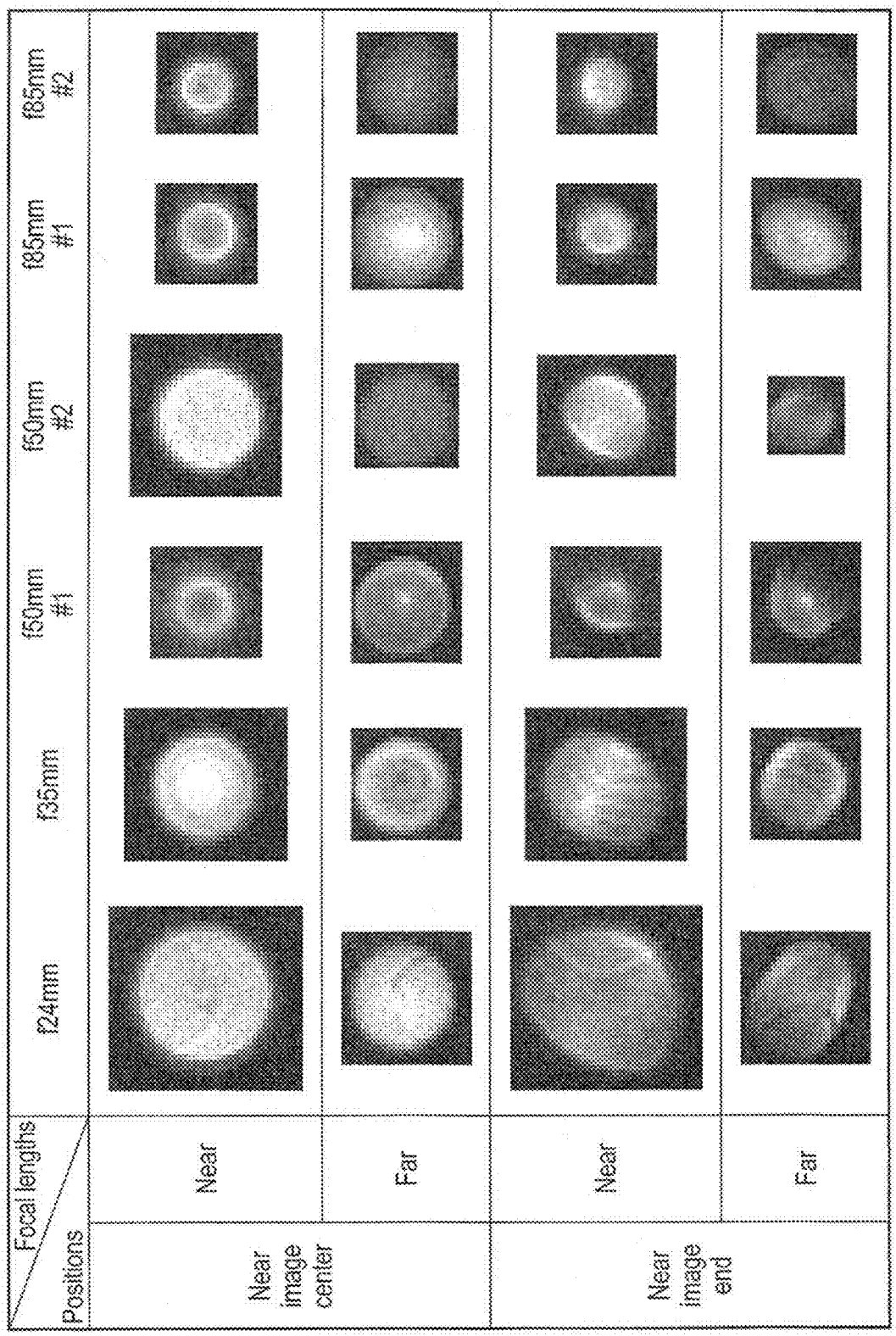
FIG. 10 is a diagram concretely illustrating position dependency of the PSF shape according to the type of lens.

Next, position dependency of the PSF shapes (lens aberration) according to the type of the lens used in the optical system (imaging module 2) of the imaging device 1 will be concretely described with reference to FIG. 10. FIG. 10 shows the PSF shapes generated in the vicinity of the center (image center) and the vicinity of the ends (image ends) of the images captured by using a plurality of lenses different in focal length, in a case where the subject position is closer than the focal point and a case where the subject position is farther than the focal point.

As shown in FIG. 10, the PSF shapes generated in the vicinity of the center of the images are substantially central and the same even in a case where the lenses are different in type, but the PSF shapes generated in the vicinity of the ends of the images are different in shape from the PSF shapes generated in the vicinity of the center of the images and different in characteristic (feature) in accordance with the type of lenses. Purple bokeh occurs in the vicinity of the edges of the PSF when the subject position is closer than the focal point and green bokeh occurs in the vicinity of the edges of the PSF when the subject position is farther than the focal point, as described with reference to FIG. 5, even in a case where the lenses are different in type.

In addition, FIG. 10 shows two examples (#1 and #2) on the lens having the focal length of 50 mm, and they indicate that the focal length is the same, i.e., 50 mm, but lens manufacturers are different (i.e., the lenses are different products). The same elements are also indicated even when the lens has the focal length of 85 mm.

In the present embodiment, the distance information is acquired by using the statistical model generated by learning the bokeh which occurs in the images but, in particular, the PSF shapes in the vicinity of the ends of the images are largely different with respect to the lens type, and accuracy of the distance acquired from the images may be deteriorated in a configuration of acquiring the distance information with one statistical model generated without considering the lens type.

For this reason, in the present embodiment, the distance to the subject is acquired from the images captured by the imaging module 2, by focusing the bokeh changing nonlinearly in accordance with the distance to the subject in the images (i.e., the position of the subject for the imaging device 1) and using the statistical model generated for each lens used in the optical system (imaging module 2) of the imaging device 1.

In the present embodiment, the bokeh changing nonlinearly in accordance with the distance to the subject includes the bokeh which occurs due to the chromatic aberration of the optical system of the imaging device 1 described with reference to FIG. 4 and FIG. 5, the bokeh which occurs in accordance with the size (i.e., the F-number) of the aperture part of the diaphragm mechanism for adjusting the quantity of the light taken in the optical system of the imaging device 1 described with reference to FIG. 6 to FIG. 8, the bokeh which changes in accordance with the position in the images captured by the imaging device 1 (imaging module 2) described with reference to FIG. 9 and FIG. 10, and the like.

Figure 11:
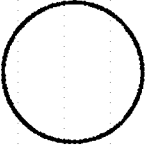
FIG. 11 is a diagram showing a relationship between nonlinearity of the PSF shape and the shape of the aperture part of the diaphragm mechanism.

The PSF shapes are also varied in accordance with the shape of the aperture part of the diaphragm mechanism. FIG. 11 shows a relationship between nonlinearity (asymmetry) of the PSF shapes and the shape of the aperture part of the diaphragm mechanism. The above-described nonlinearity of the PSF shapes is easily generated when the aperture part of the diaphragm mechanism has a shape other than a circle. In particular, the nonlinearity of the PSF shape occurs easily in a case where the shape of the aperture is odd-gonal or in a case where an even-gon is arranged asymmetrically to the horizontal or vertical axis of the image sensor 22.

In addition, in FIG. 9 described above, the PSF shapes depending on the distance to the subject in the images and the positions in the images (i.e., the bokeh having the distance dependency and the position dependency) are shown on the images, and each of the images corresponds to the above-described aberration map stored in the aberration map storage 32. That is, in the present embodiment, the aberration map storage 32 stores a plurality of aberration maps corresponding to the focal length and the F-number (i.e., the lens type and lens information) of the lens. The statistical model corresponding to the lens which causes the bokeh having the distance dependency and the position dependency represented by the aberration map to occur (i.e., the statistical model learning the bokeh having the distance dependency and the position dependency) is linked to each of the aberration maps stored in the aberration map storage 32.

Figure 12:
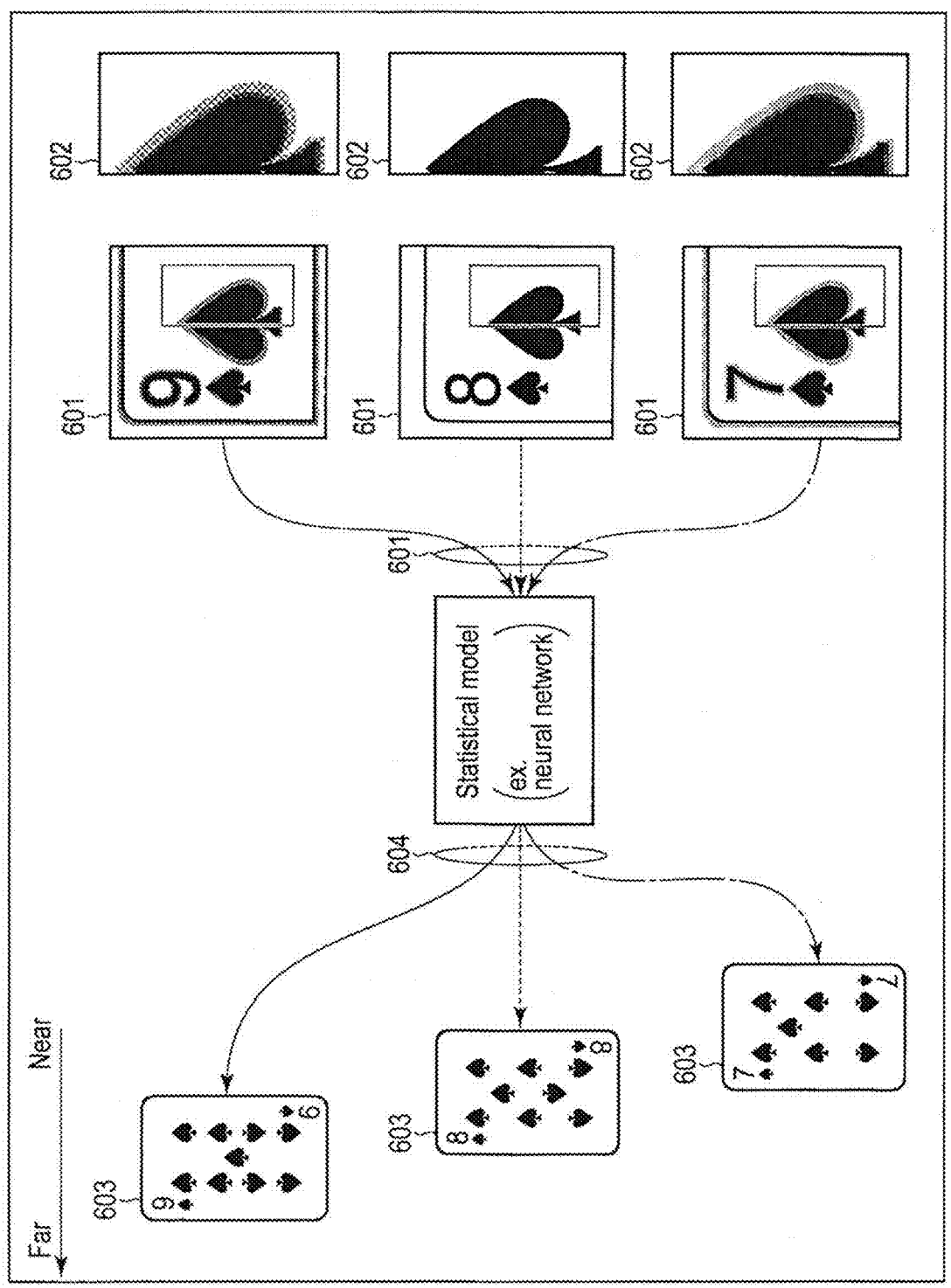
FIG. 12 is a diagram showing an outline of an operation of estimating a distance to a subject in an image with a statistical model.

FIG. 12 shows an outline of an operation of estimating the distance to the subject in an image with a statistical model. In the following descriptions, an image captured by the imaging device 1 (imaging module 2) to acquire the distance to the subject (distance information) is referred to as a captured image.

Bokeh (bokeh information) 602 which occurs in a captured image 601 shown in FIG. 12 is a physical key concerning the distance to a subject 603. More specifically, the color of the bokeh, and the size and shape of PSF are keys on the distance to the subject 603.

In the image processing module 3 (distance acquisition module 38) according to the present embodiment, a distance 604 to the subject 603 is estimated by analyzing the bokeh 602 which occurs in the captured image 601, i.e., the physical key, by the statistical model.

An example of a method of estimating the distance from the captured image by the statistical model in the present embodiment will be described below. First to third methods will be described here.

Figure 13:
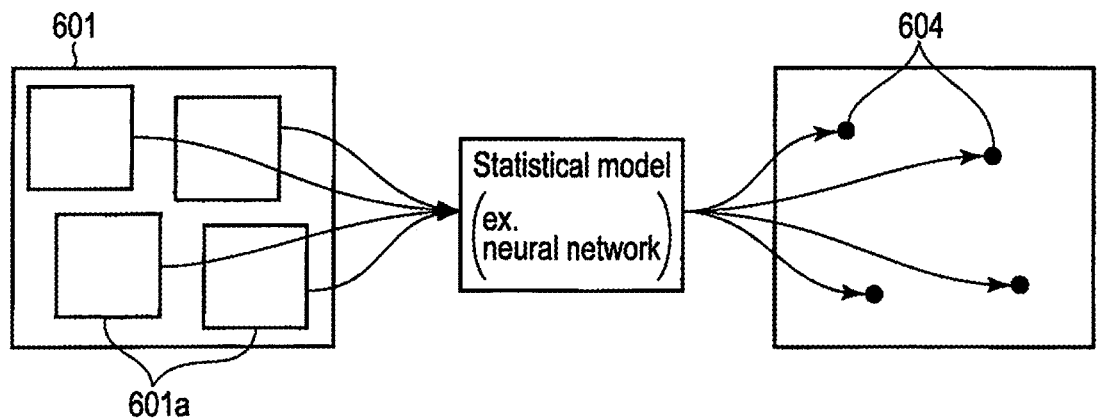
FIG. 13 is a diagram illustrating a first method of estimating the distance from a captured image.

First, the first method will be described with reference to FIG. 13. In the first method, the distance acquisition module 38 extracts a local region (image patch) 601*a* from the captured image 601.

In this case, for example, the whole region of the captured image 601 may be divided in matrix and the divided partial regions may be sequentially extracted as local regions 601*a* or the captured image 601 may be recognized and the local regions 601*a* may be extracted to cover the regions where the subject (image) is extracted. In addition, the local region 601*a* may partially overlap another local reason 601*a*.

The distance acquisition module 38 estimates a distance 604 to the subject in the local region 601*a* by inputting information on the local region 601*a* (i.e., information of the captured image 601) to the statistical model for each extracted local region 601*a*.

Thus, the statistical model to which the information on the local region 601*a* is input estimates the distance for each of the pixels constituting the local region 601*a*.

For example, when a specific pixel belongs to both a first local region 601*a* and a second local region 601*a* (i.e., a region including the pixel overlaps the first local region 601*a* and the second local region 601*a*), a distance estimated on the assumption that the pixel belongs to the first local region 601*a* is often different from a different from a distance estimated on the assumption that the pixel belongs to the second local region 601*a*.

For this reason, for example, when a plurality of local regions 601*a* partially overlapping are extracted as described above, the distance of the pixels constituting the region which the plurality of local regions 601*a* overlap may be, for example, an average value of the estimated distance of a partial region (pixels) of one of the overlapping local regions 601a and the estimated distance of a partial region (pixels) of the other local region 601a. In addition, when three or more local regions 601a partially overlapping are extracted, the distance of the pixels constituting the region which the three or more local regions 601a overlap may be determined by a majority of distances estimated respectively for several regions of the three or more overlapping local regions 601a.

Figure 14:
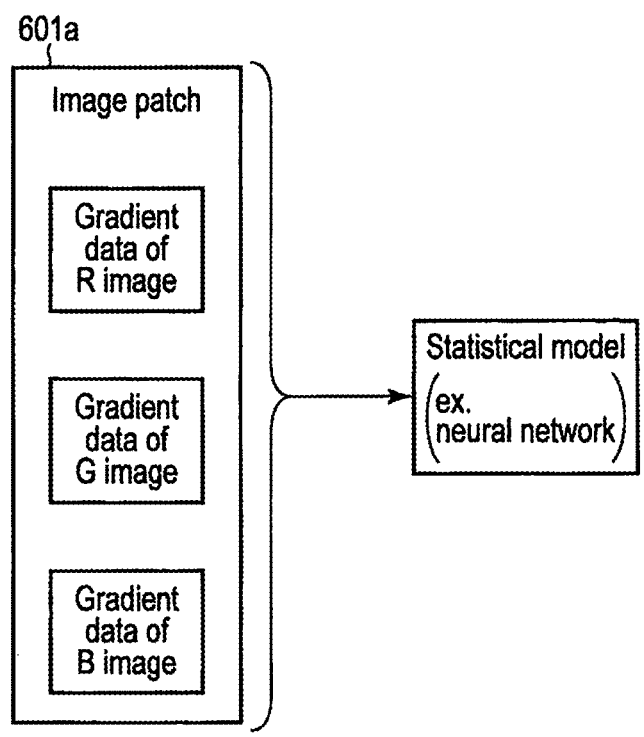
FIG. 14 is a diagram showing an example of information input to the statistical model in the first method.

FIG. 14 shows an example of information on the local region 601a input to the statistical model in the above-described first method.

For an R image, a G image, and a B image included in the captured image 601, the distance acquisition module 38 generates gradient data (gradient data of the R image, gradient data of the G image, and gradient data of the B image) of the local region 601a extracted from the captured image 601. The gradient data thus generated by the distance acquisition module 38 is input to the statistical model.

The gradient data is indicative of the difference (differential value) in pixel value between each pixel and a pixel adjacent thereto. For example, when the local region 601a is extracted as a rectangular region of n pixels (X-axis direction)×m pixels (Y-axis direction), the gradient data in which the differential values from right pixels calculated for each pixel in the local region 601a are arranged in a matrix of n rows×m columns, is generated.

The statistical model estimates the distance from the bokeh which occurs in each of the images, with the gradient data of the R image, the gradient data of the G image, and the gradient data of the B image. FIG. 14 shows a case where the gradient data of the R image, the G image, and the B image are input to the statistical model, but the gradient data of the captured image 601 (RGB image) may be input to the statistical model.

Next, the second method will be described with reference to FIG. 15. In the second method, the gradient data of each local region (image patch) 601a and positional information of the local region 601a in the captured image 601 are input to the statistical model as the information on the local region 601a in the first method.

The positional information 601b may be indicative of, for example, a center point of the local region 601a or a predetermined side such as an upper left side. In addition, positional information on the captured image 601 of each of pixels constituting the local region (image patch) 601a may be used as the positional information 601b.

The distance can be estimated in consideration of, for example, difference between the bokeh of the subject image formed by the light transmitted through the central part of the lens 21 and the bokeh of the subject image formed by the light transmitted through the end part of the lens 21, by further inputting the positional information 601b to the statistical model as described above.

That is, according to the second method, the distance can be estimated more certainly from the captured image 601, based on correlation among, the bokeh, the distance, and the position on the image.

FIG. 16 shows an example of information on the local region 601a input to the statistical model in the above-described second method.

For example, when a rectangular region of n pixels (X-axis direction)×m pixels (Y-axis direction) is extracted as the local region 601a, the distance acquisition module 38 acquires an X-coordinate value (X-coordinate data) on the captured image 601 corresponding to, for example, the center point of the local region 601a and a Y-coordinate value (Y-coordinate data) on the captured image 601 corresponding to, for example, the center point of the local region 601a.

In the second method, the X-coordinate data and the Y-coordinate data thus acquired by the distance acquisition module 38 are input to the statistical model together with the gradient data of the G image and the B image.

Furthermore, the third method will be described with reference to FIG. 17. In the third method, the extraction of the local region 601a from the captured image 601 as executed in the first method and the second method is not executed. In the third method, the distance acquisition module 38 inputs information on the whole region of the captured image 601 (i.e., the gradient data of the R image, the G image and the B image) to the statistical model.

The third method may increase the uncertainty of estimation caused by the statistical model, but can reduce the load of the distance acquisition module 38 as compared with the first method and the second method of estimating the distance 604 for each local region 601a.

In the following descriptions, the information input to the statistical model in the first to third methods is referred to as information on the images for convenience.

Figure 18:
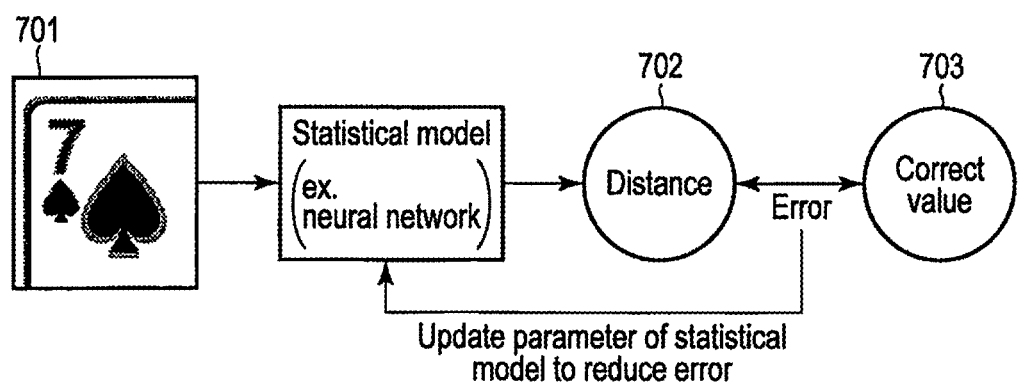
FIG. 18 is a diagram showing an example of a learning method of the statistical model.

FIG. 18 illustrates an example of a learning method of the statistical model in the embodiment. Learning the statistical model using the image captured by the imaging device 1 (imaging module 2) will be described but, for example, learning the statistical model may be executed with an image captured by the other device (camera or the like) having the same optical system as the optical system of the imaging device 1.

The image captured by the imaging module 2 to acquire the distance information has been used as the captured image in the above descriptions but, in the present embodiment, the image for the statistical model to learn the bokeh changing nonlinearly in accordance with the distance is referred to as an image for learning for convenience.

Figure 17:
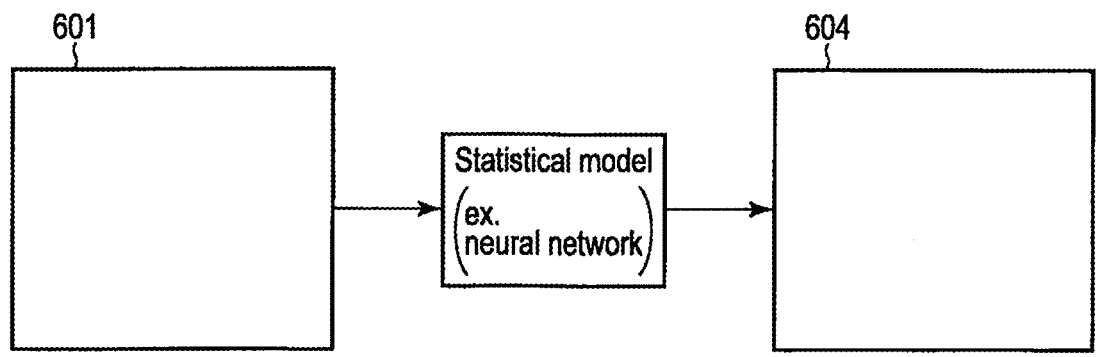
FIG. 17 is a diagram illustrating a third method of estimating the distance from a captured image.

In a case where any method of the first method described with reference to FIG. 13, the second method described with reference to FIG. 15, and the third method described with reference to FIG. 17 is employed, too, learning the statistical model is basically executed by inputting the information on an image for learning 701 to the statistical model, and feeding back an error between a distance (distance information) 702 estimated by the statistical model and a correct value 703. The feedback is indicative of updating a parameter (for example, a weight coefficient) of the statistical model so as to reduce the error.

When the first method is employed as the method of estimating the distance from the captured image, the information on the local region (gradient data) is input to the statistical model for each local region (image patch) extracted from the image for learning 701, and the distance 702 of each pixel in each local region is estimated by the statistical model, in the learning of the statistical model, too. An error obtained by comparing the distance 702 thus estimated with the correct value 703 is fed back to the statistical model.

Similarly, when the second method is employed as the method of estimating the distance from the captured image, the gradient data and the position information are input to the statistical model as information on the local region for each local region (image patch) extracted from the image for learning 701, and the distance 702 of each pixel in each local region is estimated by the statistical model, in the learning of the statistical model, too. An error obtained by comparing the distance 702 thus estimated with the correct value 703 is fed back to the statistical model.

In addition, when the third method is employed as the method of estimating the distance from the captured image, the information on the whole region of the image for learning 701 (gradient data) is totally input to the statistical model, and the distance 702 of each pixel in the image for learning 701 is estimated by the statistical model, in the learning of the statistical model, too. An error obtained by comparing the distance 702 thus estimated with the correct value 703 is fed back to the statistical model.

The statistical model in the present embodiment is generated by, for example, repeating the learning using the image while changing the distance from the imaging device 1 to the subject in a state in which the focal point is fixed. In addition, when learning one focal point is completed, a statistical model of higher accuracy can be generated by similarly learning the other focal point.

The distance to a subject estimated from an image (captured image or image for learning) will be concretely described with reference to FIG. 19.

Figure 19:
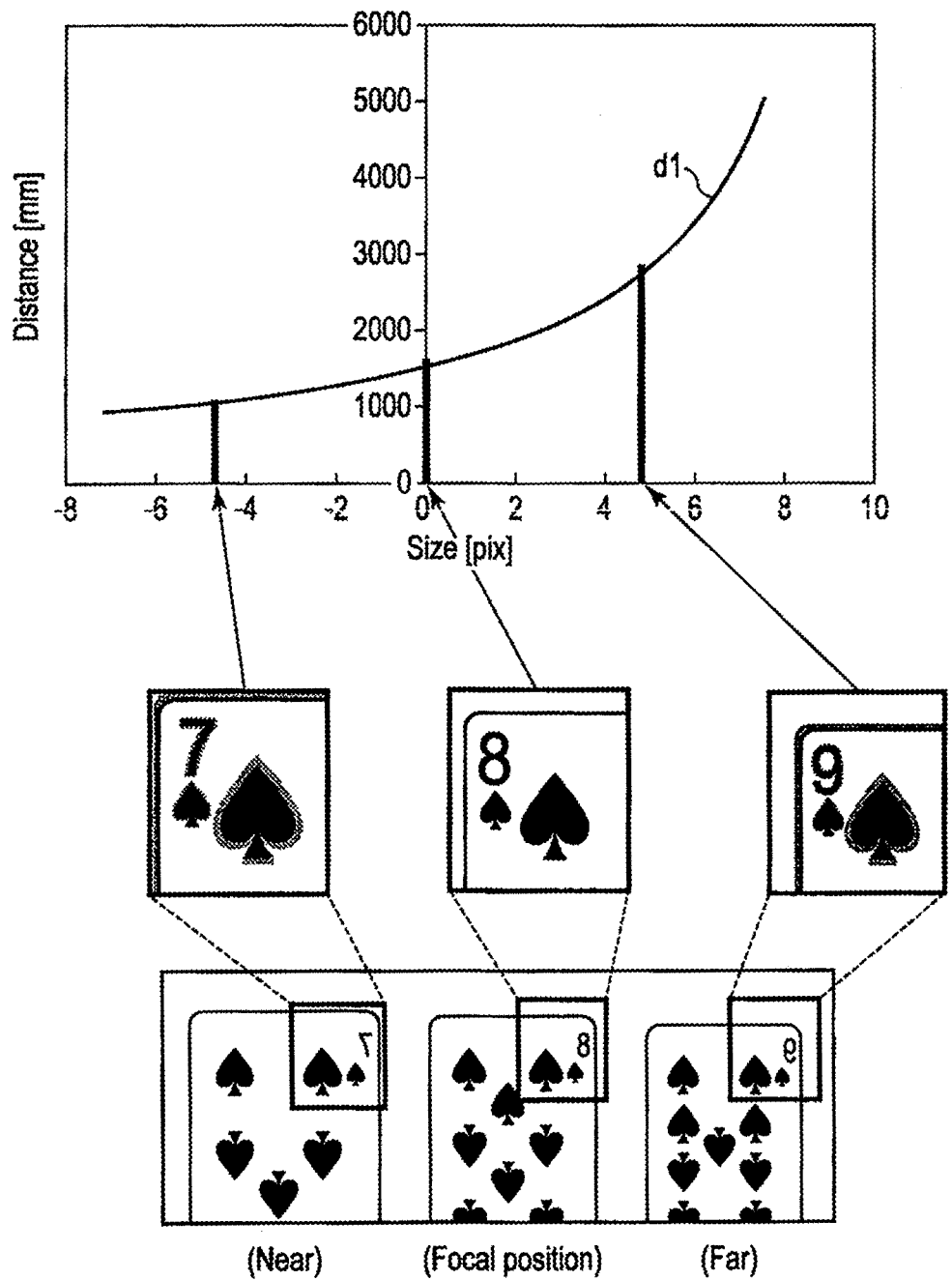
FIG. 19 is a graph concretely illustrating the distance to a subject estimated from an image.

In FIG. 19, the size of the bokeh which occurs in a case where the subject is closer than the focal point (i.e., located on the front side) is indicated by a negative value on the X axis, and the size of the bokeh which occurs in a case where the subject is farther than the focal point (i.e., located on the back side) is indicated by a positive value on the X axis. That is, the color and size of the bokeh are represented by positive and negative values in FIG. 19.

In FIG. 19, it is indicated that in any of the case where the subject position is closer than the focal point and the case where the subject position is farther than the focal point, the absolute value of the size of the bokeh (pixel) increases as the subject moves away from the focal point.

In the example shown in FIG. 19, it is assumed that the focal point in the optical system which captures the images is approximately 1500 mm. In this case, for example, the bokeh of approximately −4.8 pixels corresponds to a distance of approximately 1000 mm from the optical system, the bokeh of 0 pixels corresponds to a distance of 1500 mm from the optical system, and the bokeh of approximately 4.8 pixels corresponds to a distance of approximately 2750 mm from the optical system.

The size of the bokeh (pixel) on the X axis has been described for convenience but, as described above with reference to FIG. 6 to FIG. 10, the shapes of the bokeh which occurs on the images (PSF shapes) are different in the case where the subject is closer than the focal point and the case where the subject is farther than the focal point and are also different with respect to the positions in the images. For this reason, the values shown on the X axis in FIG. 19 are the values on which the shapes of the bokeh (PSF shapes) are reflected.

When the information on the image for learning is input to the statistical model at the learning of the statistical model, positive or negative values indicative of the color, size, and shape of the bokeh (hereinafter referred to as bokeh values), which correspond to the actual distance to the subject at the time of capturing the image for learning, are used as correct values. According to such a learned statistical model, the above-mentioned bokeh value is output as the distance to the subject in the image.

For example, since the distance to the subject is correlated with the color, size, and the shape of the bokeh as indicated by a curved line dl of FIG. 19, estimation of the distance is synonymous with estimation of the color, size, and shape of the bokeh.

An accuracy of estimation of the statistical model can be made higher by causing the statistical model to estimate the color, size, and shape of the bokeh as compared with causing the statistical model to estimate the distance directly. In this case, for example, when the information on the local region is input to the statistical model for each of local regions of n pixels (X-axis direction)×m pixels (Y-axis direction), the statistical model outputs the distance by arranging (bokeh values indicative of) the color, size, and shape of the bokeh estimated for each of the pixels constituting the local region, in n rows×m columns.

In addition, in the learning of the statistical model, images for learning are prepared by capturing the subject in the distances with the finest possible degree from a lower limit value (front side) to an upper limit value (back side) of the distances which can acquired (estimated) by the image processing module 3, and the information on the images for learning is input to the statistical model. As the correct value used in the learning of the statistical model, the bokeh values indicative of the color, size, and shape of the bokeh corresponding to the distance to the subject in a case where the images for learning are captured are used as the correct values used in the learning of statistical model. Various images for learning different in subject are desirably prepared for the learning of the statistical model.

Next, an example of a procedure of a process of generating the statistical model used in the image processing module 3 will be described with reference to a flowchart shown in FIG. 20. The process shown in FIG. 20 may be executed at, for example, the image processing module 3 (i.e., the imaging device 1) or may be executed at a device other than the imaging device 1.

First, the information on the prepared image for learning is input to the statistical model (step S1). The image for learning is an image generated by the image sensor 22, based on the light transmitted through the lens 21 provided in the optical system (imaging module 2) of the imaging device 1, i.e., an image influenced by the aberration of the optical system (lens 21). More specifically, the bokeh changing nonlinearly in accordance with the distances to the subject as described with reference to FIG. 4 to FIG. 10 occurs in the image for learning.

The information (for example, the focal length, F-number, focal point, and the like) of the optical system which captures the image for learning correlated with the bokeh which occurs in the image for learning are assumed to be grasped in the image processing module 3 executing the process shown in FIG. 20 or the other device.

When the first method is employed as the method of estimating the distance from the captured image, the gradient data of the R image, the G image, and the B image are input to the statistical model for each local region of the image for learning, as the information on the image for learning.

When the second method is employed as the method of estimating the distance from the captured image, the gradient data of the R image, the G image, and the B image and the position information on the image for learning in the local region are input to the statistical model for each local region of the image for learning, as the information on the image for learning.

When the third method is employed as the method of estimating the distance from the captured image, the gradient data of the R image, the G image, and the B image are input to the statistical model for the whole region of the image for learning, as the information on the image for learning.

In the present embodiment, it will be described that the gradient data of the R image, the G image, and the B image are input to the statistical model but, when the distance is estimated from the viewpoint of the shape (PSF shape) of the bokeh which occurs in the image for learning, at least one of the gradient data of the R image, the gradient data of the G image, and the gradient data of the B image may be input to the statistical model. In contrast, when the distance is estimated from the viewpoint of the color and size of the bokeh which occurs in the image for learning due to the chromatic aberration, at least two of the gradient data of the R image, the gradient data of the G image, and the gradient data of the B image may be input to the statistical model.

When the information on the image for learning is input to the statistical model, the distance to the subject is estimated by the statistical model (step S2). In this case, the bokeh which occurs in the image for learning is extracted from the image for learning and the distance corresponding to the bokeh is estimated, by the statistical model.

The distance estimated in step S2 is compared with the correct value acquired when the image for learning is captured (step S3).

The comparison result (error) in step S3 is fed back to the statistical model (step S4). Thus, the parameter is updated such that errors are reduced (i.e., the bokeh which occurs in the image for learning is learned), in the statistical model.

By repeating the above-described process shown in FIG. 20 for each image for learning, the statistical model learning (the distance dependency and position dependency of) the bokeh changing nonlinearly in accordance with the distance to the subject in the image for learning is generated. The statistical model thus generated is stored in the statistical model storage 31 included in the image processing module 3.

The learning of one statistical model has been described but, in the present embodiment, the statistical model is prepared for each lens used in the optical system of the imaging device 1 as described above. When it is assumed here that, for example, the imaging device 1 (imaging module 2) can use a first lens and a second lens, the statistical model corresponding to the first lens is generated by repeating the learning using the image (image for learning) captured by the imaging module 2 using the first lens. In contrast, the statistical model corresponding to the second lens is generated by repeating the learning using the image (image for learning) captured by the imaging module 2 using the second lens. The statistical model is generated similarly when the other lens is used. That is, in the present embodiment, the statistical model corresponding to each of lenses can be generated by repeating the learning while exchanging the lens used in the optical system (imaging module 2) of the imaging device 1.

It has been described that the image captured while exchanging a plurality of lenses is used as the image for learning but, in the present embodiment, a plurality of aberration maps indicative of the distance dependency and the position dependency corresponding to the focal length, the F-number, and the focal point of each lens are stored in the aberration map storage 32. Since the plurality of aberration maps are indicative of the distribution of the bokeh which occurs in the images captured by using the respective lenses, images (color images) formed by convolution of the aberration maps to a predetermined image can be used as images for learning and the learning of the statistical model corresponding to each of the lenses can be executed. According to this configuration, labor for collecting the images for learning can be reduced.

An example of a procedure of the imaging device 1 when acquiring distance information from the captured image and controlling the focus will be described with reference to a flowchart of FIG. 21. In the following descriptions, the lens 21 included in the imaging module 2 capturing the images (i.e., the lens 21 mounted on the imaging device 1) is referred to as the object lens 21.

First, the imaging module 2 (image sensor 22) generates a plurality of captured images including the subject by sequentially capturing the subject. When the focal point of the imaging module 2 is fixed, the light transmitted through the object lens 21 has a response shape of point spread function (PSF) or point image distribution function different in accordance with the distance to the subject, and the captured image influenced by the aberration of the optical system (object lens 21) of the imaging device 1 is generated by detecting the light by the image sensor 22.

The display processing module 35 executes preview display by sequentially displaying a plurality of captured images generated by the imaging module 2 on, for example, the display device (step S11).

Next, the subject selection module 36 selects the subject in the captured images subjected to the preview display (step S12). The process in step S12 is executed in accordance with, for example, user operations of the imaging device 1. More specifically, when the preview display is executed on the touch screen display, for example, the subject selection module 36 can select the subject in accordance with an operation (touch operation or the like) of designating the subject in the captured images displayed on the touch screen display.

In addition, when the imaging device 1 includes a function of extracting a specific subject (for example, a person, a face, a pupil, a mobile object or the like) in the captured images by, for example, a process (image process) based on a predetermined program, the subject selection module 36 may automatically select the subject. Such an image process may be executed in response to the user operations of physical buttons (for example, a shutter button, a menu button, and the like) provided at the imaging device 1.

In step S12, one subject may be selected or a plurality of subjects may be selected.

When the process of step S12 is executed, the subject selection module 36 acquires the number of subjects selected, positions of (regions encompassing) the subjects on the captured images, as information on the selected subjects. The positions of the subjects may be represented by, for example, X-coordinate values, Y-coordinate values, and the like on the captured images corresponding to the center points of the regions encompassing the subjects.

Next, the image acquisition module 37 acquires the captured image in which the subjected is selected in step S12 (step S13).

When the process in step S13 is executed, a distance acquisition process is executed based on the information of the subjected selected in step S12 and the captured image acquired in step S13 (step S14). In the distance acquisition process, distance information indicative of the distance to the subject selected in step S12 is acquired.

When the process in step S14 is executed, the focus control value acquaintance module 41 acquires a focus control value according to the distance information acquired in step S14 (step S15).

The focus control value acquired in step S15 will be described with reference to FIG. 22.

First, when a subject located in infinite distance is captured by the imaging module 2, the subject is generally formed at a position (hereinafter referred to as a focal point) remote from the lens (principal point) by focal length f. In contrast, when the distance to the subject is finite, the subject image is formed at a position remote from the focal point. The difference between the positions where such subject images are formed is referred to as an extension (lens extension).

In the imaging module 2, an image sensor is generally arranged at the focal point and, when the subject located in a finite distance is captured in this state, the subject image is moved away by the extension and an image in which the subject falls out of the focus (i.e., an image having bokeh on the subject) is thereby generated at the image sensor. In this case, for example, the subject can be made to come into focus by moving the lens ahead by the extension.

Figure 22:
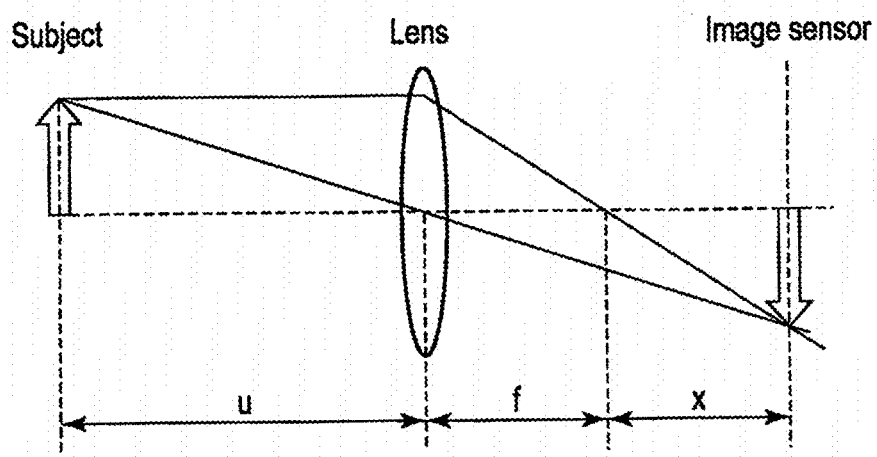
FIG. 22 is a diagram illustrating a focus control value.

A relationship among distance u from the lens to the subject, focal length f, and extension x as shown in FIG. 22 is represented by the following equation $$\frac{1}{u} + \frac{1}{f+x} = \frac{1}{f} \qquad \text{Equation (1)}$$

Therefore, the extension x can be computed by the following equation (2) using the distance u from the lens to the subject and the focal length f.

$$x = \frac{uf}{u-f} - f \qquad \text{Equation (2)}$$

In step S15 described above, such extension x is acquired as the focus control value. The focal length f of the object lens 21 can be acquired from the memory provided in the lens unit (lens information), and (the distance indicated by) the distance information acquired in step S14 is used as the distance u from the object lens 21 to the subject.

The calculation of the extension (focus control value) using the above equation (2) has been described but, for example, a table preliminarily holding the correspondence between the extension on (the focal length of) the object lens 21 and the distance from the object lens 21 to the subject may be stored in the memory provided in the object lens 21 or the like and the focus control value (extension) may be acquired with reference to the table.

The descriptions return to FIG. 21, and the lens position control module 42 controls the position of the object lens 21 based on the focus control value acquired in step S15 (step S16). In this case, the lens position control module 42 changes the position of the object lens 21 by rotating a focus adjustment mechanism (for example, a focus ring) provided in the lens unit. Information indicative of correspondence between the focus control value (extension) and the amount of rotation of the focus adjustment mechanism (lens movement) is held in the memory provided in the object lens 21, and the lens position control module 42 controls the position of the object lens 21 based on the information.

When the process in step S16 is executed, the imaging module 2 captures the subject (step S17). Thus, in the present embodiment, the selected subject in step S12 can be made to come into focus and the image including the subject can be captured.

It has been described that the position of the object lens 21 is controlled to make the subject selected in step S12 come into focus but, in the present embodiment, for example, the position of the object lens 21 may be controlled to make the subject fall out of focus (i.e., defocus). Furthermore, for example, a defocus amount may be designated in response to user operations on the touch screen display, various buttons, or the like. In this case, the focus control value acquired in step S15 includes the F-number (aperture) according to the defocus amount and the diaphragm mechanism provided in the lens unit is further controlled based on the F-number in step S16.

In addition, when subjects different in distance are selected in step S12, the position of the object lens 21 may be controlled such that one of the subjects is made to come into focus and the other subjects are not made to come into focus.

Whether the subject selected in step S12 is made to come into focus or not may be designated in accordance with user operations on, for example, the touch screen display, various buttons or the like when the subject is selected.

Next, an example of the procedure of the above-described distance acquisition process (i.e., the process of step S14 shown in FIG. 21) will be described with reference to a flowchart shown in FIG. 23.

The memory provided in the lens unit as described above preliminarily holds the lens information on the object lens 21. The lens information corresponds to the specification values (catalog values) of the object lens 21 and includes, for example, the focal length, the F-number, and the like of the object lens 21. In addition, the lens information may include information such as a current focal point (or a control value on the focus adjustment mechanism) and the like.

In the distance acquisition process, the lens information acquisition module 33 acquires the above-described lens information from the lens unit (step S21).

Figure 21:
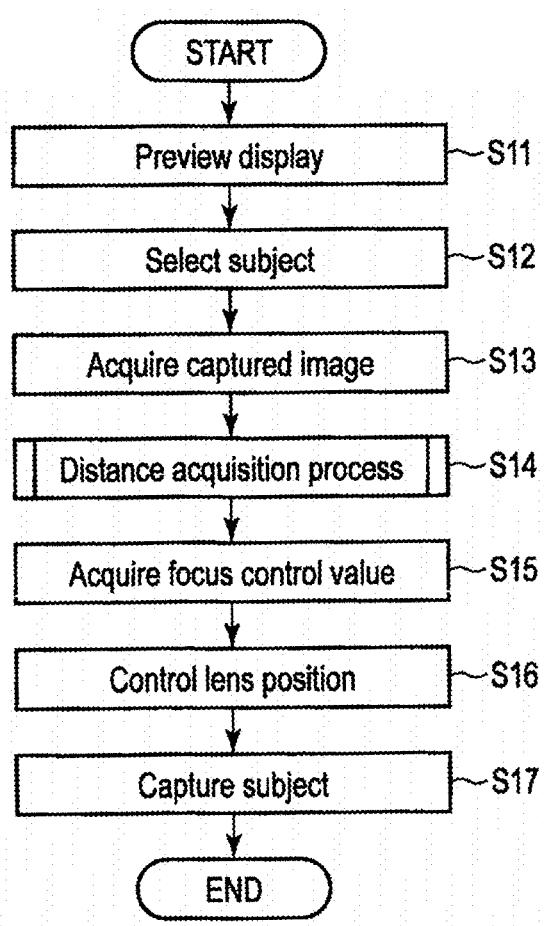
FIG. 21 is a flowchart showing an example of a procedure of an image processing device when acquiring distance information from the captured image and controlling a focus.

The image processing module 3 is assumed to hold, for example, the lens information on the lens used in the optical system of the imaging device 1 when the process shown in FIG. 21 is previously executed.

Thus, the statistical model selection module 34 determines whether the lens information (i.e., the focal length, F-number, focal point, and the like) of the object lens 21 is changed or not, based on the lens information acquired in step S21 and the lens information held in the image processing module 3 (step S22). When at least one of the focal length, the F-number, and the focal point or their combination can be acquired as the lens information, whether the lens information of the object lens 21 is changed or not may be determined based on the information acquired as the lens information.

When it is determined that the lens information of the object lens 21 is changed (YES in step S22), the statistical model selection module 34 determines whether the statistical model is selected with the lens information (catalog value of the object lens 21) acquired in step S21 or not (step S23). When the statistical model is selected with the lens information, an appropriate statistical model may not be selected according to the reliability of the lens information while the processing amount of the statistical model selection module 34 can be reduced. For this reason, for example, whether the statistical model is selected with the lens information or not is assumed to be preset by the user.

When it is determined that the statistical model is not selected with the lens information, based on the above-described user settings (NO in step S23), the statistical model selection module 34 estimates the aberration map (PSF shape) of the object lens 21 from an image (hereinafter referred to as a sample image) captured by the imaging module 2 with the object lens (step S24).

The sample image used in step S24 is assumed to be, for example, an image (test pattern image) obtained by capturing a test pattern such as a white dot image and white-black stripe. The statistical model selection module 34 estimates the aberration map of the object lens 21 by extracting the bokeh (PSF shape) which occurs at each position of the sample image. For example, the sample image may be held in the memory provided in the lens unit or may be captured by the imaging module 2 and held the image processing module 3.

In step S24, the aberration map of the whole sample image may be estimated or the aberration map of a partial region of the sample image may be estimated. In addition, when the aberration map of a partial region of the sample image is estimated, the partial region may be a region (hereinafter referred to as a subject region) including the subject selected in step S12 shown in FIG. 21 or may be a region close to the end of the sample image where the bokeh having a characteristic shape occurs.

Next, the statistical model selection module 34 collates the aberration map of the object lens 21 estimated in step S24 with each of the aberration maps stored in the aberration map storage 32 (step S25). In step S25, the statistical model selection module 34 calculates similarity of the aberration map of the object map 21 to each of the aberration maps stored in the aberration map storage 32 and specifies the aberration map of higher similarity.

The aberration map is specified by executing the processes in steps S24 and S25, but the aberration map may be specified with, for example, a first sample image (i.e., image including bokeh) subjected to aberration of the optical system (object lens 21) of the imaging device 1 and a second sample image (i.e., image including no bokeh) little influenced by the aberration obtained by reducing the quantity of light taken in the imaging device 1 (i.e., reducing the size of the aperture part). More specifically, the similarity of the first sample image (defocused image) to an image generated by convoluting each of the aberration maps stored in the aberration map storage 32 to the second image may be calculated and the aberration map used for generation of the image of high similarity (i.e., the aberration map convoluted in the image) may be specified.

Each of the aberration maps stored in the aberration map storage 32 is linked to the statistical model as described above. For this reason, the statistical model selection module 34 selects the statistical model linked to the aberration map specified as described above, from a plurality of statistical models stored in the statistical model storage 31 (step S26). The statistical model selected in step S26 corresponds to the statistical model which can estimate the distance at high accuracy in the captured image captured by the imaging module 2 using the object lens 21, and is set in the image processing module 3 as the statistical model corresponding to (the lens information such as the focal length, the F-number, and the focal point) the object lens 21.

When the process of step S26 is executed, the distance acquisition module 38 inputs the information (gradient data) on the subject region in the captured image acquired in step S13 shown in FIG. 21 to the statistical model selected in step S26 (step S27).

When the process of step S27 is executed, the distance to the subject in the subject region (i.e., the subject selected in step S12) is estimated in the statistical model and the statistical model outputs the estimated distance. The distance to the subject is estimated and output for each of the pixels constituting the subject region (captured image). The distance acquisition module 38 thereby acquires the distance information indicative of the distance output from the statistical model (step S28).

Figure 23:
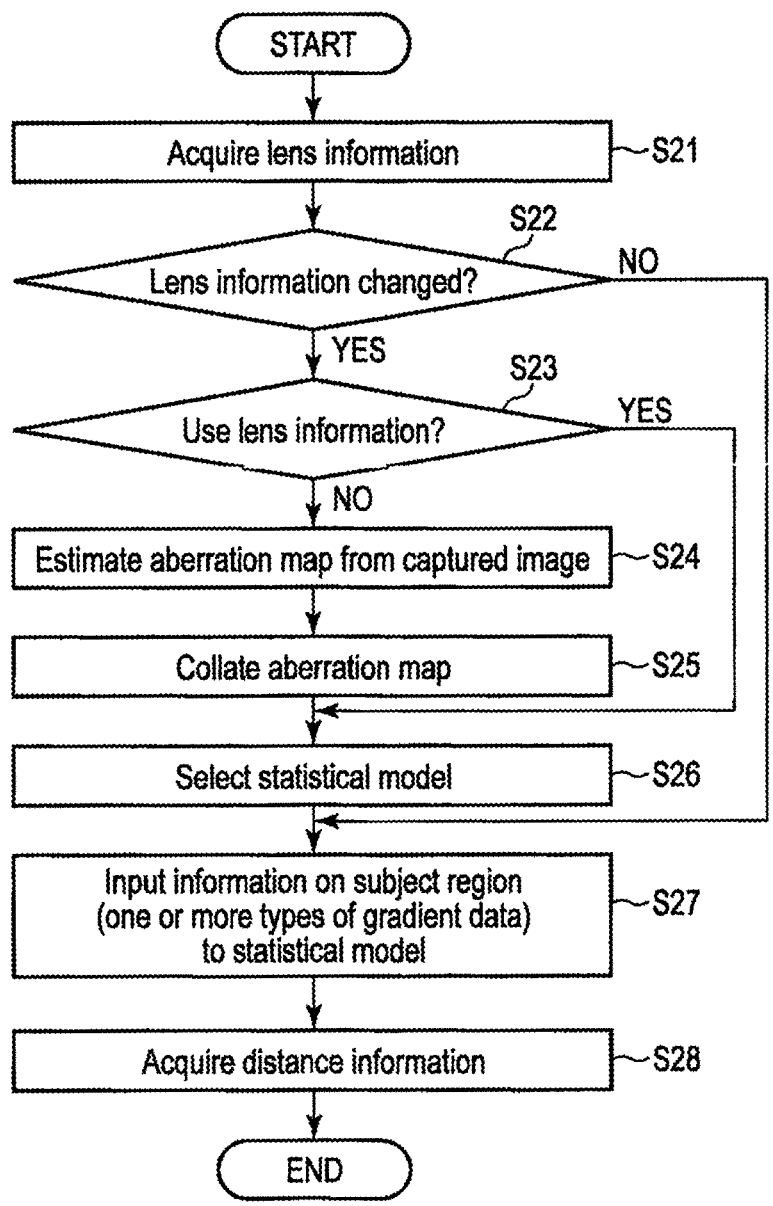
FIG. 23 is a flowchart showing an example of a procedure of a distance acquisition process.

The statistical model selected in step S26 (i.e., the statistical model set by the image processing module 3 as the statistical model according to the object lens 21) is used every time the processes of FIG. 23 are executed, unless the object lens 21 is replaced with the other lens.

That is, when it is determined in step S22 that the lens information of the object lens 21 is not changed (NO in step S22), the processes in steps S27 and S28 may be executed with the already set statistical model (i.e., the statistical model selected by previously executing the processes in FIG. 21 and FIG. 23).

In contrast, when it is determined in step S23 that the statistical model is selected with the lens information (YES in step S23), the statistical model selection module 34 selects the statistical model according to the lens (i.e., the object lens 21) specified based on (the focal length, F-number, focal point, and the like included in) the lens information, from a plurality of statistical models stored in the statistical model storage 31 (step S26). After the process in step S26 is executed, the above-explained processes in steps S27 and S28 may be executed.

When a plurality of subjects are selected in step S12 shown in FIG. 21, the processes in steps S27 and S28 shown in FIG. 23 are executed for each of the subjects (regions). The distance information indicative of the distance to each of the plurality of subjects can be thereby acquired. In addition, for example, when a plurality of subjects are selected from different captured images, the processes following step S13 shown in FIG. 21 may be executed for each of the captured images.

In addition, it has been described that the process of step S26 is executed when the statistical model is selected with the lens information in the example shown in FIG. 23 but, for example, the bokeh (PSF shape) which occurs in the image captured by the imaging module 2 using the object lens 21 can be simulated by executing ray tracing from the lens information (focal length, F-number, and current focal point). In such a case, the statistical model may be selected by executing the process corresponding to step S25 with the aberration map estimated based on the simulation results.

In addition, it has been described that the processes of steps S24 and S25 are executed when determining that the statistical model is not selected with the lens information in step S23 but, for example, steps S24 and S25 may also be executed when the lens information cannot be acquired.

In addition, for example, even when it is determined that the statistical model is selected with the lens information in step S23, the statistical model matching the lens information acquired in step S21 often does not exist. In this case, the processes in steps S24 and S25 may be executed and the statistical model linked to the aberration map of highest similarity may be selected.

Furthermore, the aberration information corresponding to the aberration map of the object lens 21 often can be obtained from the manufacturer (lens maker) of the object lens 21. In this case, the statistical model may be selected by executing the process corresponding to step S25 with the aberration information.

In addition, the user may manually set the focal length, the F-number, and the focal point and execute step S26 with the set values.

In the present embodiment, as described above, a statistical model generated by learning bokeh which occurs in an image for learning influenced by aberration of an optical system (second optical system) and which changes nonlinearly in accordance with a distance to a subject in the image, is preliminarily stored in the statistical model storage 31 and, when a captured image influenced by aberration of an optical system (first optical system) is acquired, the distance information indicative of a distance to a subject in the image is acquired by inputting the captured image to the statistical model, and the position of the object lens 21 is controlled based on the distance information.

In the present embodiment, having such a configuration, for example, since the object lens 21 does not need to be moved more than needed, the subject can be made to come into focus at a high speed as compared with a general auto-focus (AF) function of automatically making a specific subject come into focus.

In addition, the subject can be made to come into focus at a higher speed since the distance information can be acquired (i.e., the distance can be estimated) from an image in the present embodiment, as compared with a configuration of calculating the distance to the subject with two or more images (depth from defocus (DFD)) and adjusting the lens position (focal point).

That is, in the present embodiment, the time (focus adjustment time) required to control the position of the object lens 21 can be shortened, and convenience of the user capturing the image with the imaging device 1 can be improved.

In addition, in the present embodiment, preview display to sequentially display the images captured by the imaging module 2 is executed, the subject in displayed captured image is selected, and the distance information of the distance to the selected subject is acquired.

The subject can be selected based on, for example, the user operations on the captured image displayed on the touch screen display (for example, an operation of touching the position of the subject in the captured image). Furthermore, in the present embodiment, the position of the object lens 21 can be controlled so as to make the selected subject come into focus as described above or the position of the object lens 21 can be controlled so as to make the selected subject not come into focus. According to such a configuration, the image which the user intends can be captured.

In addition, in the present embodiment, the statistical model is stored for each lens in the statistical model storage 3, and the distance information indicative of the distance to the subject (selected subject) in the captured image is acquired by inputting the captured image in the statistical model according to the object lens 21 included in the optical system (imaging module 2) of the imaging device 1.

The bokeh changing nonlinearly in accordance with the distance to the subject in the image which the statistical model learns in the present embodiment includes, for example, at least one of the bokeh which occurs due to the chromatic aberration of the optical system and the bokeh which occurs in accordance with the size or shape of the aperture part of the diaphragm mechanism for adjusting the quantity of the light taken in the optical system. In addition, the bokeh changing nonlinearly in accordance with the distance to the subject in the image may include the bokeh further changing in accordance with the position in the image. The chromatic aberration has been mainly described as the aberration of the optical system in the present embodiment, but the statistical model used in the present embodiment may be a statistical model for learning the bokeh which occurs due to the other aberration (i.e., for estimating the distance based on the bokeh which occurs due to the other aberration). In the present embodiment, for example, the distance can be estimated with monochromatic aberration which occurs in a monochromatic image but the accuracy of estimation of the distance can be improved in a color image including the chromatic aberration.

That is, the present embodiment notices that the bokeh which occurs in the image has distance dependency and position dependency and that the bokeh changes in accordance with (the type of) the lens used in the optical system of the imaging device 1, and can improve the accuracy of the distance (estimation accuracy) by acquiring the distance information indicative of the distance to the subject in the captured image with the statistical model corresponding to the object lens 21 included in the imaging module 2 which captures the captured image.

Furthermore, in the present embodiment, the lens information on the object lens 21 is acquired, and the statistical model corresponding to the lens (object lens 21) specified based on the lens information is selected from a plurality of statistical models stored in the statistical model storage 31. The lens information can be acquired from the lens unit (memory). According to such a configuration, the distance information can be acquired with the appropriate statistical model corresponding to the object lens 21. Moreover, in the configuration thus using the lens information, the processing amount can be reduced when selecting the statistical model.

In contrast, when the lens information is not used, the aberration map stored in the aberration map storage 32 is specified based on the bokeh which occurs in the sample image influenced by the aberration of the optical system of the imaging device 1, and the distance information is acquired with the statistical model according to the aberration map (i.e., the statistical model linked to the aberration map). According to such a configuration, the processing amount is increased as compared with the configuration using the lens information, but a statistical model more appropriate than a case of merely selecting the statistical model with the lens information can be selected.

When the aberration map is specified as described above, the bokeh which occurs in the whole sample image may be used or the bokeh which occurs in a partial region of the sample image may be used. In other words, the aberration map may be specified by noticing the bokeh which occurs in the whole sample image or the aberration map may be specified by noticing the only bokeh which occurs in a partial region of the sample image. A more appropriate aberration map can be specified when the bokeh which occurs in the whole sample image is used, but the processing amount of specifying the aberration map can be reduced when the bokeh which occurs in a partial region of the sample image is used.

In the present embodiment, the distance information indicative of the distance to the subject is acquired based on the bokeh which occurs in the captured image captured by the imaging module 2 but, when the bokeh size is, for example, 10 pixels or more, the distance information often cannot be acquired.

For this reason, for example, the distance acquisition module 38 executes the processes shown in FIG. 24 as a measure to be taken when the distance information cannot be acquired in accordance with the above bokeh size. More specifically, the distance acquisition module 38 determines whether the size of the bokeh which occurs in the subject region of the captured image is within the permissible range or not (step 31). In step S31, when the size of the bokeh which occurs in the subject region is a predetermined value (for example, 10 pixels) or more, it is determined that the bokeh size is not within the permissible range. In contrast, when the size of the bokeh which occurs in the subject region is less than a predetermined value, it is determined that the bokeh size is within the permissible range.

When it is determined that the bokeh size is not within the permissible range (NO in step S31), the distance acquisition module 38 reduces the resolution of the captured image (subject region) (step S32). When the resolution of the captured image is thus reduced (lowered), the size (pixel number) of the bokeh which occurs in the subject region of the captured image can be reduced to fall within the permissible range.

When the process of step S32 is executed, the process of step S27 shown in FIG. 23 is executed with the captured image having the resolution reduced in step S32.

In contrast, when it is determined that the bokeh size is within the permissible range (YES in step S31), the process of step S32 is not executed.

It has been described that the process of step S32 is executed when the size of the bokeh which occurs in the subject region of the captured image is a predetermined value or more but, for example, when edge cannot be extracted in the captured image (subject region), the bokeh size may be estimated to be large and the process of step S32 may be executed.

The processes of FIG. 24 may be executed at arbitrary timing until the process of step S27 shown in FIG. 23 is executed after the process of step S13 shown in FIG. 21 is executed.

In the present embodiment, it has been described that the statistical model is generated (prepared) for each lens used in the optical system of the imaging device 1 but, for example, one statistical model (i.e., the statistical model learning the image captured with each of a plurality of lenses) may be generated for a plurality of lens, in the statistical model storage 31.

Furthermore, in the present embodiment, for example, one statistical model may be stored in the statistical model storage 31 in a configuration of controlling the position of the object lens 21 based on the distance information indicative of the distance estimated with the statistical model.

In addition, in the present embodiment, it has been described that the imaging device 1 has the configuration shown in FIG. 1 but, for example, at least several parts of the image processing module 3 and the control module 4 may be arranged in a device other than the imaging device 1.

Furthermore, a phase difference sensor is provided at an imaging device including a general autofocus (AF) function, but the present embodiment may be applied to such an imaging device provided with a phase difference sensor. Even when the imaging device 1 is provided with a phase difference sensor, the focus may be controlled as described in the present embodiment but, for example, the user may select one of the focus control described in the present embodiment and the focus control using a phase difference sensor.

For example, the distance may be estimated with the statistical model learning with, for example, bokeh information and semantic information of the whole image but, in this case, fine bokeh information cannot be used and an enormous quantity of learning data is required to assign a robust property to the environment (i.e., to enable the distance to be estimated from various captured images with a high accuracy).

In contrast, in the present embodiment, since the statistical model learns the only bokeh which occurs in the image, the robust property can be improved (i.e., a high robust property can be implemented) when acquiring the distance (distance information) from the captured image, as compared with a case of learning with the above-described bokeh information and semantic information.

In addition, a filter is provided at the aperture part of the camera (i.e., the lens of the camera is tampered with) to estimate the distance with a monocular camera but, in this configuration, light transmissivity is deteriorated by the filter and the color balance is easily deviated. Furthermore, the manufacturing costs are increased by increasing the number of components of the filter or the like.

In contrast, in the present embodiment, degradation of the light transmissivity or deviation of the color balance does not occur and, furthermore, the manufacturing costs are not increased.

In addition, in the present embodiment, when the statistical model learns bokeh in each local region extracted from the image, the statistical model capable of estimating the distance of high accuracy from the captured image can be generated. In this case, by inputting the information on the local region extracted from the captured image to the statistical model, the distance information indicative of the distance to the subject in the local region can be acquired for each local region.

The information on the local region includes, for example, information indicative of a difference in pixel value between each of pixels constituting the local region and an adjacent pixel, but the other information may be used as the information on the local region.

More specifically, the position information of the local region in the image may be further input to the statistical model as the information on the local region. According to such a configuration, the distance information of a higher accuracy can be acquired in consideration of the position of the local region. The position information is, for example, information indicative of coordinates of a center point of the local region in the captured image but may be the other information.

It has been described that the statistical model learns the bokeh for each local region extracted from the image but, when the statistical model entirely learns the bokeh of all regions of the image for learning and inputs the bokeh of all regions of the captured image to estimate the distance, calculation load of the image processing module 3 (distance acquisition module 38) can be reduced.

It has been described that the statistical model of the present embodiment is, for example, the neural network or random forest, but the other algorithm may be applied.

Next, the imaging device 1 (image processing module 3) according to the modified example of the embodiment will be described. In the following descriptions, the same portions as those of the drawings used in the descriptions of the above-described embodiment are denoted by the same reference numerals and their detailed descriptions are omitted, and portions different from the present embodiment will be mainly described.

First, an outline of the modified example will be described with reference to FIG. 25. As shown in FIG. 25, in the modified example, when the statistical model estimates the distance 604 from the information on the captured image 601, a degree of uncertainty of the estimation (hereinafter referred to as a degree of uncertainty) 801 for each pixel is calculated and the degree of uncertainty 801 is output together with the distance 604. The method of calculating the degree of uncertainty 801 is not limited to a specific method, but various known methods can be employed as the calculating method.

In the modified example, the distance acquisition module 38 confirms the degree of uncertainty output from the statistical model and, when the degree of uncertainty is a threshold value or more, the distance acquisition module 38 abandons, for example, the acquired distance information (i.e., the distance information in which the degree of uncertainty is indicative of the distance larger than a threshold value or more). For example, the abandoned distance information is not used for control of the position of the object lens 21.

In addition, when the degree of uncertainty to the distance estimated for a specific pixel is a threshold value or more, the distance acquisition module 38 can correct the distance with a distance estimated for a pixel around the pixel (i.e., a distance in which the degree of uncertainty is less than a threshold value). For the correction, for example, an average value of the distances estimated for the peripheral pixels may be used as a correction value or the correction value may be determined by majority decision of the distances.

FIG. 26 shows an example of a learning method of the statistical model in the modified example. As shown in FIG. 26, in the modified example in which the statistical model outputs the degree of uncertainty, basically, the information on the image for learning 701 is input to the statistical model, and the error between the distance 702 estimated by the statistical model and the correct value 703 is fed back to the statistical model. However, a degree of uncertainty 802 for the distance 702 estimated as described above is calculated in the statistical model to which the information on the image for learning 701 is input. For this reason, in the modified example, an error obtained by dividing an error of the distance 702 and the correct value 703 by a square of the degree of uncertainty 802 is assumed to be fed back. In this case, since the error becomes zero when the degree of uncertainty 802 is made infinite, the square of the degree of uncertainty 802 is added to the error as a penalty.

In the modified example, a parameter (for example, a weight factor) of the statistical model is updated so as to reduce the value obtained by correcting the error between the distance 702 and the correct value 703 with the degree of uncertainty 802 as described above.

It can be estimated that, for example, when the degree of uncertainty 802 is high while the error of the distance 702 and the correct value 703 estimated by the statistical model is not made, the distance 702 may be accidentally estimated. In this case, the statistical model can recognize that learning of the distance 702 (correct value 703) is short.

In the modified example, such deviation of learning can be reduced by using the degree of uncertainty calculated by the statistical model.

The learning method described with reference to FIG. 26 is applied to each of the statistical models stored in the statistical model storage 31.

Operations of the imaging device 1 according to the modified example will be described. The processes of generating the statistical model used in the imaging device 1 (image processing module 3) according to the modified example are the same as the above-described processes shown in FIG. 20 other than using the error corrected with the degree of uncertainty, and their descriptions are omitted.

A procedure of the imaging device 1 when acquiring the distance information from the captured image will be described. In the modified example, the same processes as the above-described processes shown in FIG. 22 are executed but are different with respect to the process (distance acquisition process) of step S14 shown in FIG. 22.

An example of a procedure of the distance acquaintance process executed by the image processing module 3 in the modified example will be described with reference to a flowchart shown in FIG. 27.

First, processes of steps S41 to S47 corresponding to the above-described processes of steps S21 to S27 shown in FIG. 23 are executed.

In the modified example, when the process of step S47 is executed, the distance to the subject is estimated and the degree of uncertainty to the distance is calculated by the statistical model. The distance to the subject and the degree of uncertainty are output from the statistical model for each of the pixels constituting the captured image (subject region).

Thus, the distance acquisition module 38 acquires the distance information indicative of the distance and the degree of uncertainty output from the statistical model for each of the pixels constituting the subject region in the captured image (step S48).

Next, processes in steps S49 and S50 are executed for each element of the distance information (i.e., distance information for each pixel) acquired in step S48. In the following descriptions, the distance information which is the target of processes in steps S49 and S50 is referred to as target distance information, and the degree of uncertainty to the distance indicated by the target distance information is referred to as target uncertainty. Furthermore, a pixel constituting the subject region in the captured image from which the distance indicated by the target distance information is estimated (output) in the statistical model is referred to as a target pixel.

In this case, the distance acquisition module 38 determines whether the target uncertainty is a threshold value or more (step S49).

When it is determined that the target uncertainty is a threshold value or more (YES in step S49), the distance acquisition module 38 specifies the distance information which is indicative of the distance estimated for a pixel (hereinafter referred to as a marginal pixel) located in the periphery of the target pixel in the captured image and in which the degree of uncertainty to the distance indicated by the distance information is smaller than the threshold value, of the distance information for each pixel acquired in step S48. A plurality of elements or one element of the distance information may be specified. The distance acquisition module 38 corrects the distance indicated by the target distance information with the distance indicated by the specified distance information (step S50). When the distance information in which the degree of uncertainty is smaller than a threshold value is not included in the distance information indicative of the distance estimated for the marginal pixel, the distance indicated by the target distance information is set to, for example, a predetermined unfixed value.

When a plurality of elements of distance information are specified, the distance indicated by the target distance information may be corrected to an average value or the like of the distances indicated by the respective elements of the distance information (i.e., the distances estimated for the marginal pixels) or may be corrected based on a majority of the distances indicated by the plurality of elements of distance information. In addition, when one element of the distance information is specified, the distance indicated by the target distance information may be corrected based on the distance indicated by the element of the distance information.

In contrast, when it is determined that the target uncertainty is not a threshold value or more (i.e., smaller than a threshold value) (NO in step S49), the process in step S50 is not executed.

Next, it is determined whether the processes in steps S49 and S50 are executed for whole distance information acquired in step S48 or not (step S51).

When it is determined that the processes are not executed for the whole distance information (NO in step S51), the flow returns to step S49 and the processes are repeated. In this case, the processes are executed by using the distance information which is not subjected to the processes in steps S49 and S50 as the target distance information.

Figure 27:
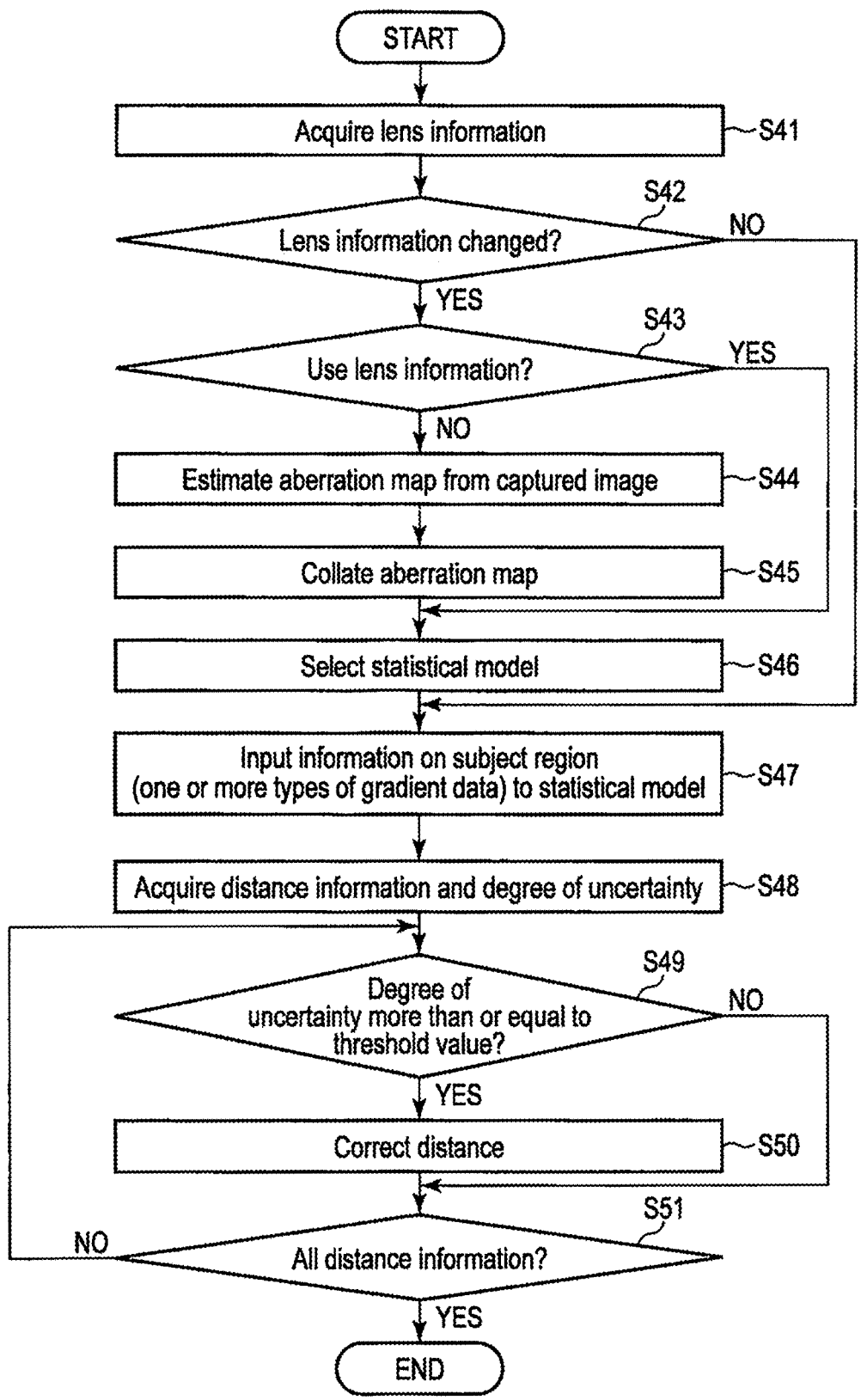
FIG. 27 is a flowchart showing an example of a procedure of an image processing module.

In contrast, when it is determined that the processes are executed for the whole distance information (YES in step S51), the distance acquiring process shown in FIG. 27 is ended.

In the example shown in FIG. 26, correcting the distance in which the degree of uncertainty is a threshold value or more with the distance estimated for the marginal pixel has been described, but the distance information indicative of the distance in which the degree of uncertainty is a threshold value or more may be abandoned and may not be used for control of the position of the object lens 21.

In the modified example, as described above, the distance in which the degree of uncertainty is a threshold value or more (i.e., the distance in which the degree of uncertainty is high and which may be erroneously estimated at a high possibility) can be prevented from being used as it is, by using the degree of uncertainty calculated from the statistical model.

Application Examples

Application examples employing the imaging device 1 configured as described in the above embodiment and modified example will be described below. Examples of using the distance information acquired by the imaging device 1 (image processing module 3) will be described. The distance information described below may be, for example, the distance information acquired in step S14 shown in FIG. 21 or the distance information acquired by executing the distance acquisition process for the image including the subject captured in step S17 shown in FIG. 21.

Figure 28:
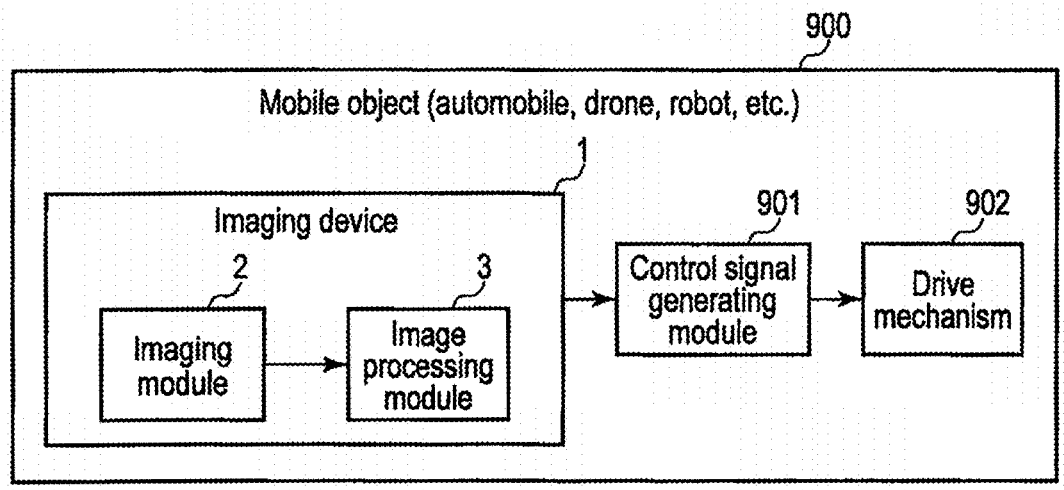
FIG. 28 is a diagram showing an example of a functional configuration of a mobile object including the imaging device.

FIG. 28 shows an example of a functional configuration of a mobile object 900 incorporating the imaging device 1. In FIG. 28, a control module 4 provided in the imaging device 1 is omitted.

The mobile object 900 can be implemented as, for example, an automobile having an automatic driving function, an unmanned aircraft, an autonomous mobile robot, or the like. The unmanned aircraft is an airplane where no human can be boarded on, rotor craft, glider, or airship, which can be made to fly by remote control or on autopilot, and includes, for example, a drone (multi-copter), radio-controlled airplane, crop-spraying helicopter, and the like. The autonomous mobile robot includes a mobile robot such as an automated guided vehicle (AGV), a cleaning robot for cleaning a floor, a communication robot for providing various types of guidance to visitors and the like. The mobile object 900 includes not only the moving robot itself, but also an industrial robot including a drive mechanism for moving or rotating a part of the robot such as a robot arm, and the like.

As shown in FIG. 28, the mobile object 900 includes, for example, the imaging device 1, a control signal generating module 901, and a drive mechanism 902. The imaging device 1 is installed such that, for example, the imaging module 2 can capture a subject of the mobile object 900 or its part subject in the traveling direction.

Figure 29:
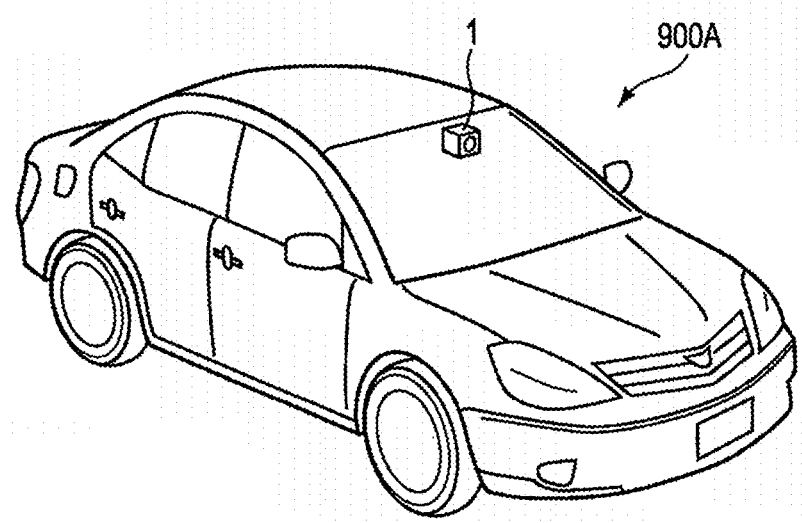
FIG. 29 is a diagram illustrating a case where the mobile object is an automobile.

As shown in FIG. 29, when the mobile object 900 is an automobile 900A, the imaging device 1 is installed as what is called a front camera to capture an image of a front part. The imaging device 1 may be installed as what is called a rear camera to capture a rear side when moving back. In addition, a plurality of imaging devices 1 may be installed as front cameras and rear cameras. Furthermore, the imaging device 1 may be installed and provided with a function of what is called a drive recorder. In other words, the imaging device 1 may be a video recorder.

FIG. 30 shows an example of a case where the mobile object 900 is a drone 900B. The drone 900B includes a drone body 911 corresponding to the drive mechanism 902 and four propeller portions 912 to 915. Each of the propeller portions 912 to 915 has a propeller and a motor. The motor drive is transferred to the propellers to rotate the propellers, and the drone 900B floats with the lift resulting from the rotation. The imaging device 1 is mounted at, for example, the lower part of the drone body 911.

In addition, FIG. 31 shows an example of a case where the mobile object 900 is an autonomous mobile robot 900C. A power unit 921 including a motor, wheels, and the like, which corresponds to the drive mechanism 902, is provided at the lower part of the mobile robot 900C. The power unit 921 controls the number of revolutions of the motor and the orientations of the wheels. When the motor drive is transferred, the wheels in contact with the road surface or the floor surface are rotated and the orientations of the wheels are controlled, and the mobile robot 900C can be thereby moved in an arbitrary direction. In the example shown in FIG. 31, the imaging device 1 is installed at a head part of the humanoid mobile robot 900C such that, for example, the imaging module 2 captures a front side of the mobile robot 900C. The imaging device 1 may be installed so as to capture the rear side or the right and left sides of the mobile robot 900C or a plurality of imaging devices 1 may be installed so as to capture a plurality of orientations. In addition, dead reckoning can be executed by providing the imaging device 1 at a small robot in which space to be equipped with a sensor or the like is small and estimating the self-position, the self-attitude, and the position of the subject.

The mobile object 900 shown in FIG. 32 is a robot arm 900D and, when controlling movement and rotation of a part of the robot arm 900D, imaging device 1 may be installed at a distal end of the robot arm 900D, or the like. In this case, an object to be grasped by the robot arm 900D is captured by the imaging module 2 provided at the imaging device 1, and the image processing module 3 can estimate a distance to the object to be grasped by the robot arm 900D. The object can be thereby grasped correctly with the robot arm 900D.

The control signal generating module 901 outputs a control signal for controlling the drive mechanism 902, based on the distance information indicative of the distance to the subject output from the imaging device (image processing module 3). The drive mechanism 902 drives the mobile object 900 or a part of the mobile object 900 according to the control signal output from the control signal generating module 901. The drive mechanism 902 executes, for example, at least one of movement, rotation, acceleration, deceleration, increasing or decreasing thrust (lift), change of the traveling direction, and switching between a normal driving mode and an automatic driving mode (collision avoidance mode), of the mobile object 900 or a part of the mobile object 900, and activation of a safety device such as an airbag. For example, when the distance to the subject is shorter than a threshold value, the drive mechanism 902 may execute at least one of movement, rotation, acceleration, increasing or decreasing thrust (lift), change of the direction toward an object, and switching from the automatic driving mode (collision avoidance mode) to the normal driving mode.

The drive mechanism 902 of the automobile 900A shown in FIG. 29 is, for example, tires. The drive mechanism 902 of the drone 900B shown in FIG. 30 is, for example, propellers. The drive mechanism 902 of the mobile robot 900C is, for example, leg parts. The drive mechanism 902 of the robot arm 900D shown in FIG. 32 is, for example, a support portion which supports the distal end provided with the imaging device 1.

The mobile object 900 may further includes a speaker and a display to which the information on the distance to the subject as output from the imaging device 1 is input. The speaker and the display are connected to the imaging device 1 in a wired or wireless manner, and configured to output speech or images on the distance to the subject. Furthermore, the mobile object 900 may include an illumination unit to which the information on the distance to the subject as output from the imaging device 1 is input and which can be turned on and off in accordance with, for example, the distance to the subject.

In addition, for example, in a case where the mobile object 900 is the drone 900B, the imaging module 2 acquires an image by capturing the subject and determines whether the distance to the subject is larger than or equal to a threshold value or not, when preparation of a map (three-dimensional shapes of objects), structural examination of buildings and terrains, and inspection of cracks or electric-wire fractures, and the like are executed from the sky. The control signal generating module 901 generates the control signal to control a driving force of the drone 900B, based on the determination results, such that a distance to the inspection target is constant. It is assumed that the driving force also includes the lifting force. The drive mechanism 902 can make the drone 900B fly in parallel with the inspection target by operating the drone 900B, based on the control signal. When the mobile object 900 is a surveillance drone, a control signal for controlling the thrust of the drone to keep the distance to the object to be surveyed constant may be generated.

When the mobile object 900 (for example, the drone 900B) is used for maintenance and the like of various types of infrastructures (hereinafter simply referred to as infrastructures), an image of a part which need to be repaired (hereinafter referred to as a part to be repaired), including a portion or the like where a crack or corrosion occurs can be captured by the imaging module 2 and the distance to the part to be repaired can be obtained. In this case, the size of the part to be repaired can be calculated by using the distance to the part to be repaired. According to this, for example, the maintenance worker of the infrastructure can be made to recognize the part to be repaired by displaying the part to be repaired on a map showing the whole infrastructure. In addition, notifying the maintenance worker of the size of the part to be repaired in advance is useful for executing a smooth repairing work. By controlling the position of the lens 21 based on the distance (distance information) from the part to be repaired, the image in which the part to be repaired is made to come into focus may be captured and the image may be presented to the maintenance worker.

In addition, at the flight of the drone 900B, an image which the imaging module 2 captures in the ground direction is acquired, and it is determined whether the distance to the ground is more than or equal to a threshold value or not. The control signal generating module 901 generates the control signal for controlling the thrust of the drone 900B such that the height from the ground is a designated height, based on the determination results. The drive mechanism 902 can make the drone 900B fly at the designated height by operating the drone 900B, based on the control signal. If the drone 900B is a drone for spraying pesticide, the drone 900B can evenly spray the pesticide with ease by thus keeping the height from the ground constant.

In addition, when the mobile object 900 is the automobile 900A at cooperative run of automobiles or the drone 900B at cooperative flight of drones, the imaging module 2 captures an automobile in front or a peripheral drone and determines whether the distance to the automobile or the drone is a threshold value or more. The control signal generation module 901 generates the control signal to control the speed of the automobile 900A or the thrust of the drone 900B, such that a distance to an automobile in front or a peripheral drone is constant, based on the determination results. The drive mechanism 902 can easily execute cooperative run of automobiles and cooperative flight of the drones by operating the automobile 900A and drone 900B, based on the control signal.

Furthermore, when mobile object 900 is an automobile 900A, the mobile object may be configured to accept driver's instructions via a user interface such that the driver of the automobile 900A can set (change) the threshold value. The automobile 900A can be thereby made to run at a desired distance between vehicles which the driver desires. In addition, the threshold value may be changed in accordance with the speed of the automobile 900A in order to keep a safe distance from an automobile in front. The safe distance between vehicles is varied depending on the speed of the automobile 900A. Thus, the threshold value can be set larger (longer) as the speed of the automobile 900A is higher.

In addition, when the mobile object 900 is the automobile 900A, a predetermined distance in the traveling direction may be set to a threshold value and a control signal to operate the brake or to operate a safety device such as an air bag or the like when an object appears within the distance set as the threshold value may be generated. In this case, the safety device such as an automatic brake, an air bag or the like is provided in the drive mechanism 902.

According to at least one embodiment described above, an imaging device, a method, and a storage medium capable of improving the user convenience can be provided.

Furthermore, each of various functions described in the embodiment and the modified example may be implemented by a circuit (processing circuit). An example of a processing circuit includes a programmed processor such as a central processing module (CPU). This processor performs each described function by executing a computer program (instruction group) stored in a memory. The processor may be a microprocessor including an electrical circuit. Examples of processing circuits include digital signal processors (DSPs), application specific integrated circuits (ASICs), microcontrollers, controllers, and other electrical circuit components. Each of the components other than the CPU described in the present embodiment may also be realized with a processing circuit.

Since various types of processing of the present embodiment can be realized with a computer program, the same effects as those of the present embodiment can be easily realized by just installing the computer program to the computer by way of a computer readable storage medium storing the computer program and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging device comprising a first optical system including a lens and configured to control a position of the lens to adjust a focal point, the imaging device further comprising:
    first storage configured to store a statistical model generated by learning bokeh which occurs in an image influenced by aberration of a second optical system and changes nonlinearly in accordance with a distance to a subject in the image; and
    a processor configured to:
    acquire an image influenced by aberration of the first optical system;
    input the acquired image to the statistical model and acquire distance information indicative of a distance to a subject in the image; and
    control the position of the lens included in the first optical system.

2. The imaging device of claim 1, wherein the processor is configured to:
    select the subject included in the acquired image; and
    acquire a distance to the selected subject.

3. The imaging device of claim 2, wherein
    the processor is configured to control the position of the lens included in the first optical system to make the selected subject come into focus.

4. The imaging device of claim 2, wherein
    the processor is configured to control the position of the lens included in the first optical system to make the selected subject not come into focus.

5. The imaging device of claim 1, wherein
    the processor is configured to select the subject based on a user operation.

6. The imaging device of claim 1, wherein
    the statistical model is stored in the first storage for each lens used in the second optical system, and
    the processor is configured to input the acquired image to a statistical model corresponding to the lens included in the first optical system and acquire distance information indicative of the distance to the subject in the image.

7. The imaging device of claim 6, wherein
    bokeh changing nonlinearly in accordance with the distance to the subject in the image includes bokeh further changing in accordance with the position in the image.

8. The imaging device of claim 6, wherein the processor is configured to:
    acquire lens information on the lens included in the first optical system;
    select a statistical model corresponding to a lens specified based on the lens information, from the first storage; and
    input the acquired image to the specified statistical model and acquire distance information indicative of the distance to the subject in the image.

9. The imaging device of claim 6, further comprising:
    second storage configured to store a first aberration map indicative of distribution of bokeh which occurs in an image influenced by aberration of the second optical system using the lens and which depends on a distance to the subject in the image and a position in the image, for each statistical model corresponding to each of lenses used in the second optical system, wherein
    the processor is configured to:
    specify a first aberration map stored in the second storage, based on bokeh which occurs in an image influenced by aberration of the first optical system; and
    input the acquired image to a statistical model corresponding to the specified first aberration map and acquires distance information indicative of a distance to the subject in the image.

10. The imaging device of claim 1, wherein the processor is configured to:
    display an image influenced by aberration of the first optical system;
    select a subject in the displayed image in accordance with a user operation; and
    input information on a region including the selected subject to a statistical model corresponding to the lens included in the first optical system and acquire distance information indicative of a distance to the subject;
    control a position of the lens included in the first optical system so as to make the selected subject come into focus, based on the acquired distance information; and
    capture an image in a state where the position of the lens is controlled.

11. A method executed by an imaging device comprising a first optical system including a lens and configured to control a position of the lens to adjust a focal point, the imaging device further comprising first storage configured to store a statistical model generated by learning bokeh which occurs in an image influenced by aberration of a second optical system and changes nonlinearly in accordance with a distance to a subject in the image,
    the method comprising:
    acquiring an image influenced by aberration of the first optical system;
    inputting the acquired image to the statistical model and acquiring distance information indicative of a distance to a subject in the image; and
    controlling the position of the lens included in the first optical system.

12. A non-transitory computer-readable storage medium having stored thereon a computer program which is executable by a computer of an imaging device comprising a first optical system including a lens and configured to control a position of the lens to adjust a focal point, the imaging device further comprising first storage configured to store a statistical model generated by learning bokeh which occurs in an image influenced by aberration of a second optical system and changes nonlinearly in accordance with a distance to a subject in the image,
    the computer program comprising instructions capable of causing the computer to execute functions of:
    acquiring an image influenced by aberration of the first optical system;

inputting the acquired image to the statistical model and acquiring distance information indicative of a distance to a subject in the image; and controlling the position of the lens included in the first optical system.

\* \* \* \* \*